(12) United States Patent
Tanaka et al.

(10) Patent No.: US 8,502,105 B2
(45) Date of Patent: Aug. 6, 2013

(54) JOINING METHOD OF DISSIMILAR METAL PLATES AND DISSIMILAR METAL JOINED BODY

(75) Inventors: Koujirou Tanaka, Hiroshima (JP); Katsuya Nishiguchi, Higashihiroshima (JP); Seiji Sasabe, Fujisawa (JP)

(73) Assignees: Mazda Motor Corporation (JP); Kobe Steel, Ltd. (JP)

( * ) Notice: Subject to any disclaimer, the term of this patent is extended or adjusted under 35 U.S.C. 154(b) by 198 days.

(21) Appl. No.: 12/909,610

(22) Filed: Oct. 21, 2010

(65) Prior Publication Data
US 2011/0097594 A1   Apr. 28, 2011

(30) Foreign Application Priority Data
Oct. 23, 2009   (JP) .................. 2009-244345

(51) Int. Cl.
*B23K 1/00*  (2006.01)
(52) U.S. Cl.
USPC ........................ 219/86.22; 428/594
(58) Field of Classification Search
USPC ................. 219/86, 86.4, 89, 91, 91.1, 91.21, 219/92, 108, 109, 110, 111, 117 R; 428/594, 428/600
See application file for complete search history.

(56) References Cited

U.S. PATENT DOCUMENTS

| 4,072,843 A | * | 2/1978 | Szabo | ..................... 219/91.21 |
| 4,675,494 A | * | 6/1987 | Dilay | ..................... 219/91.21 |
| 4,678,887 A | | 7/1987 | Nagel et al. | |
| 2008/0026247 A1 | | 1/2008 | Nakagawa et al. | |
| 2008/0241572 A1 | * | 10/2008 | Miyamoto et al. | ............ 428/600 |

FOREIGN PATENT DOCUMENTS

| JP | 59-193773 | 11/1984 |
| JP | 2008-000754 A | 2/2008 |
| JP | 2008-023583 A | 2/2008 |
| JP | 2009-202828 A | 9/2009 |

OTHER PUBLICATIONS

The Extended European Search Report dated Feb. 3, 2011; Application No. 10013776.9-2302.

* cited by examiner

*Primary Examiner* — Henry Yuen
*Assistant Examiner* — Thien S Tran
(74) *Attorney, Agent, or Firm* — Studebaker & Brackett PC

(57) ABSTRACT

The joining method includes a step of lapping the aluminum alloy plate and the plated steel plate via adhesive, a pre-heating step of clamping both metal plates lapped in the lapping step between a pair of electrodes for spot welding and applying pressure thereto, and applying a current between the pair of electrodes, a cooling step of pressurizing both metal plates at a pressing force higher than that at the start of the pre-heating step in a state where conduction between the electrodes is stopped, and continuing this pressurization over a predetermined cooling time, and a welding step of pressurizing both metal plates at a pressing force higher than that at the start of the pre-heating step, and welding both of the metal plates by applying a current higher than the conduction current value in the pre-heating step between the pair of electrodes.

2 Claims, 19 Drawing Sheets

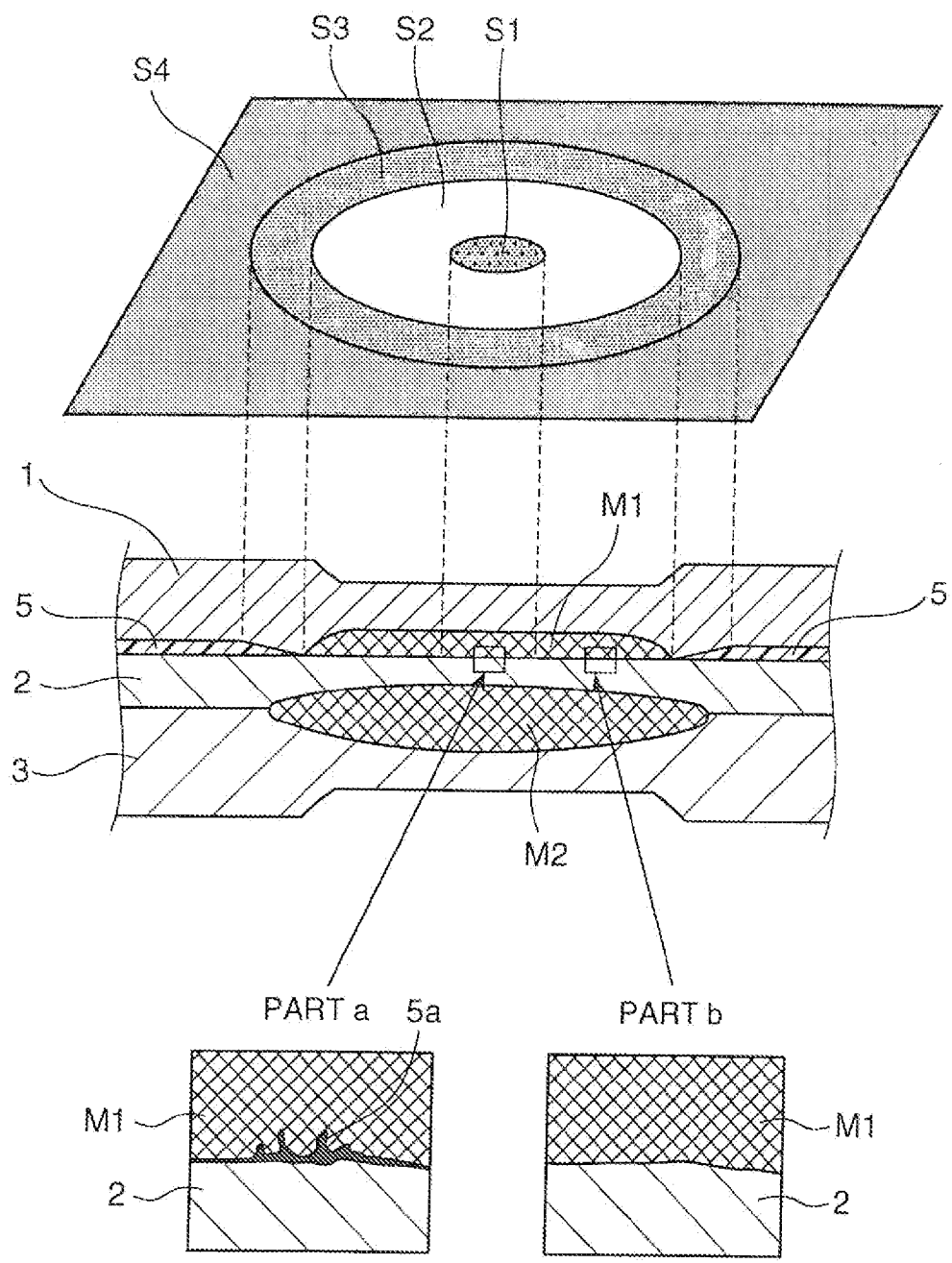

FIG.10

| | USED ELECTRODE | | PRE-PRESSURIZATION | | PRE-HEATING | | | COOLING | | WELDING | | | PEEL STRENGTH (RELATIVE VALUE) |
|---|---|---|---|---|---|---|---|---|---|---|---|---|---|
| | ALUMINUM SIDE | STEEL PLATE SIDE | PRESSING FORCE kN | TIME cyc (msec) | PRESSING FORCE kN | CURRENT VALUE kA | TIME cyc (msec) | PRESSING FORCE kN | TIME cyc (msec) | PRESSING FORCE kN | CURRENT VALUE kA | TIME cyc (msec) | |
| EXAMPLE 1 | TYPE 1 | TYPE 1 | 2.0 | 60 (1000) | 2.0 | 2.0 | 15 (250) | 7.0 | 60 (1000) | 7.0 | 14.0 | 18 (300) | 3.0 |
| EXAMPLE 2 | TYPE 1 | TYPE 1 | 2.0 | 60 (1000) | 2.0→7.0 | 2.0 | 10+5 (167+83) | 7.0 | 60 (1000) | 7.0 | 14.0 | 18 (300) | 3.0 |
| EXAMPLE 3 | TYPE 1 | TYPE 1 | 2.0 | 60 (1000) | 2.0 | 2.0 | 15 (250) | 5.0 | 60 (1000) | 5.0 | 13.0 | 18 (300) | 2.7 |
| EXAMPLE 4 | TYPE 1 | TYPE 1 | 5.0 | 60 (1000) | 2.0→5.0 | 2.0 | 10+5 (167+83) | 5.0 | 30 (500) | 5.0 | 13.0 | 18 (300) | 2.8 |
| EXAMPLE 5 | TYPE 1 | TYPE 1 | 5.0 | 60 (1000) | 2.0 | 2.0 | 15 (250) | 5.0 | 30 (500) | 5.0 | 13.0 | 18 (300) | 2.7 |
| EXAMPLE 6 | TYPE 1 | TYPE 1 | 5.0 | 60 (1000) | 2.0 | 2.0 | 10 (167) | 5.0 | 20 (333) | 5.0 | 13.0 | 18 (300) | 2.7 |
| EXAMPLE 7 | TYPE 1 | TYPE 1 | 7.0 | 60 (1000) | 2.0→7.0 | 2.0 | 10+5 (167+83) | 7.0 | 30 (500) | 7.0 | 14.0 | 18 (300) | 3.0 |
| EXAMPLE 8 | TYPE 1 | TYPE 1 | 7.0 | 60 (1000) | 2.0 | 2.0 | 10 (167) | 7.0 | 30 (500) | 7.0 | 14.0 | 18 (300) | 3.0 |
| EXAMPLE 9 | TYPE 1 | TYPE 1 | 7.0 | 60 (1000) | 2.0 | 2.0 | 15 (250) | 7.0 | 20 (333) | 7.0 | 14.0 | 18 (300) | 3.0 |
| EXAMPLE 10 | TYPE 1 | TYPE 2 | 3.0 | 60 (1000) | 3.0 | 3.0 | 15 (250) | 7.0 | 40 (667) | 7.0 | 15.0 | 18 (300) | 3.0 |
| EXAMPLE 11 | TYPE 1 | TYPE 3 | 3.0 | 60 (1000) | 3.0 | 3.0 | 15 (250) | 7.0 | 20 (333) | 7.0 | 16.0 | 18 (300) | 3.0 |
| COMPARATIVE EXAMPLE 1 | TYPE 1 | TYPE 1 | 2.0 | 60 (1000) | 2.0 | 2.0 | 15 (250) | — | — | 7.0 | 12.0 | 18 (300) | 1.0 |
| COMPARATIVE EXAMPLE 2 | TYPE 1 | TYPE 1 | 7.0 | 60 (1000) | — | — | — | — | — | 7.0 | 10.0 | 18 (300) | 0.2 |

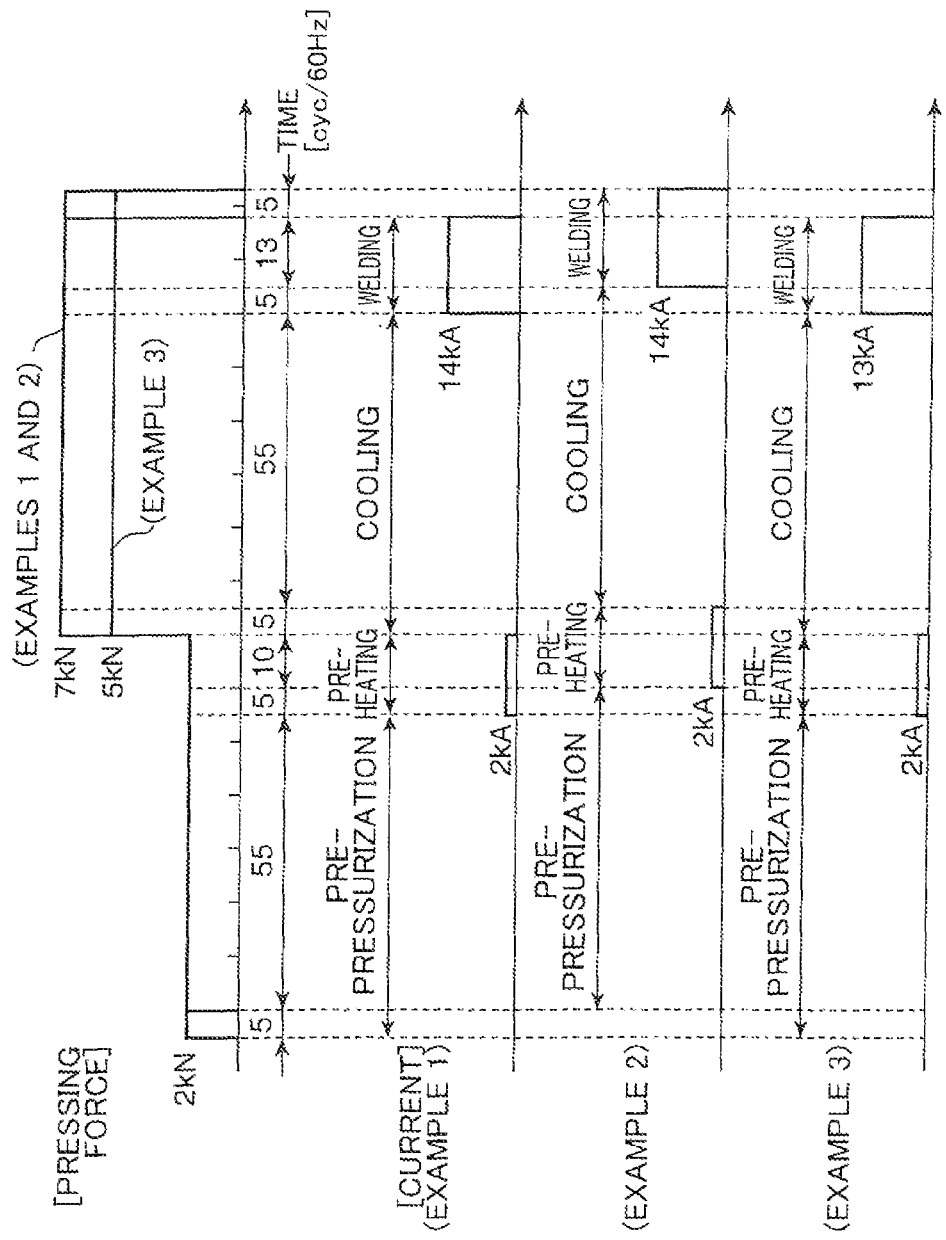

JOINING METHOD OF DISSIMILAR METAL PLATES AND DISSIMILAR METAL JOINED BODY

BACKGROUND OF THE INVENTION

1. Field of the Invention

The present invention relates to a method of joining dissimilar metal plates of an aluminum alloy plate and a plated steel plate by means of adhesion of an adhesive and spot welding, and the like.

2. Description of the Background Art

Conventionally, in the fields of transport equipment such as automobiles and rail cars, machine parts, architectural buildings and the like, research and development concerning methods of joining dissimilar metals such as, for example, a steel material and aluminum alloy, and a joined body of such dissimilar metals.

In particular, in the field of automobiles, there is further demand of achieving the weight-saving of the vehicle body in light of the severe energy situation in recent years, and lightweight aluminum alloy plate materials are often used together with steel plates. Nevertheless, with a product such as an automobile that is used under a severe corrosion environment, if the steel plate and the aluminum alloy plate are directly joined, there is a problem in that corrosion (electrolytic corrosion) caused by the potential difference between the two occurs easily. Thus, as technology of preventing such electrolytic corrosion, the so-called weld-bond method of joining both of the metal plates via an adhesive and performing spot welding thereto is known.

However, since an adhesive has inferior conductivity and will cause an increase in the conduction resistance during the spot welding process, it is not possible to increase the welding current sufficiently. Moreover, since the cleanliness factor of the interface of the steel plate and the aluminum alloy plate is also aggravated, there is a problem in that, consequently, sufficient joint strength cannot be obtained.

Thus, for example, Japanese Unexamined Patent Application Publication No. 2008-23583 describes that, upon joining two metal plates of dissimilar metals based on weld-bonding, both of the metal plates are caused to come in direct contact by discharging the adhesive (sealing material) interposed between both of the metal plates at least from the center of the joint part, and passes a welding current therethough in the foregoing state.

Moreover, as described in Japanese Unexamined Patent Application Publication No. S59-193773, also known is a joining method of including a thermoplastic resin spacer in the adhesive layer applied between two metal plates, pressurizing and passing currently through both of the metal plates in the foregoing state with the electrodes for welding, and performing welding while removing the adhesive and the spacer from the joint part.

Meanwhile, Japanese Unexamined Patent Application Publication No. 2008-23583 forms the tip of the electrode in a convex curved surface in order to efficiently discharge the adhesive from the center of the joint part. However, if the tip of the electrode is formed in a convex curved surface, although the adhesive of the portion corresponding to the apex of such convex curved surface will be discharged reliably, the adhesive will only be discharged locally, and, as a result of the joint area of the steel plate and the aluminum alloy plate becoming small, there is a possibility that sufficient joint strength cannot be obtained. Moreover, although Japanese Unexamined Patent Application Publication No. 2008-23583 also proposes heating the vicinity of the joint part using an external heating means configured from a high frequency coil or the like in order to facilitate the discharge of the adhesive, there is a possibility that the temperature of the adhesive of the joint part may not be effectively increased due to the influence of the thermal conduction to the periphery thereof.

Since Japanese Unexamined Patent Application Publication No. S59-193773 performs pressurization and conduction in a state of clamping a thermoplastic resin spacer between the metal plates, it is expected that the adhesive can be effectively discharged from the joint part in comparison to Japanese Unexamined Patent Application Publication No. 2008-23583. Nevertheless, if the metal plates are joined in a state where such a thermoplastic resin spacer is interposed therebetween, there is a possibility that the thermoplastic resin spacer will melt and flow to the outside, for example, when the obtained joined body is coated and subject to thermal treatment in the subsequent drying step. If resin flows out as described above, the sealability of the joint part will be lost, and, in particular, this will become a crucial defect as a structural material of a vehicle body. Moreover, Japanese Unexamined Patent Application Publication No. S59-193773 does not describe the preferred conditions during pressurization and conduction, and it was not necessarily clear as to how the process from pressurization to conduction needs to be performed in order to obtain sufficient joint strength.

SUMMARY OF THE INVENTION

The present invention was devised in view of the foregoing circumstances. Thus, an object of this invention is to effectively improve the joint strength upon joining dissimilar metal plates by combining adhesion using an adhesive and spot welding.

In order to achieve the foregoing object, the present invention provides a method of joining dissimilar metal plates of an aluminum alloy plate and a plated steel plate based on adhesion using an adhesive and spot welding. This joining method has a lapping step of lapping the aluminum alloy plate and the plated steel plate via the adhesive, a pre-heating step of clamping both of the metal plates that have been lapped in the lapping step between a pair of electrodes for spot welding and applying pressure thereto, and applying a current between the pair of electrodes, a cooling step of pressurizing, after the pre-heating step, both of the metal plates at a pressing force which is higher than that at the start of the pre-heating step in a state where conduction between the electrodes is stopped, and continuing this pressurization over a predetermined cooling time, and a welding step of pressurizing, after the cooling step, both of the metal plates at a pressing force which is higher than that at the start of the pre-heating step, and welding both of the metal plates by applying a current which is higher than the conduction current value in the pre-heating step between the pair of electrodes.

BRIEF DESCRIPTION OF THE DRAWINGS

FIG. 7 is a diagram schematically showing the structure of the interface between the aluminum alloy plate and the plated steel plate;

FIG. 8A to FIG. 8C are diagrams showing the shape of the electrodes used in the experiments, wherein FIG. 8A shows the type 1 electrode, FIG. 8B shows the type 2 electrode, and FIG. 8C shows the type 3 electrode, respectively;

FIG. 10 is a table showing the joining conditions and the peel strength of the Examples and the Comparative Examples;

FIG. 11 is a time chart showing the joining conditions of Examples 1 to 3;

DESCRIPTION OF THE PREFERRED EMBODIMENTS

FIG. 1 to FIG. 5 are diagrams explaining an embodiment of the joining method of dissimilar metal plates according to the present invention. As shown in FIG. 1 to FIG. 5, in this embodiment, three metal plates of an aluminum alloy plate 1, a plated steel plate 2 in which its surface is plated, and a non-plated steel plate 3 (corresponds to a "separate steel plate" of the present invention) in which its surface is not plated are joined based on adhesion using an adhesive 5 and spot welding. Note that, in FIG. 1 to FIG. 5, the illustration of the plated layers on either surface of the plated steel plate 2 is omitted (the same applies to FIG. 6 and FIG. 7 described later).

As the aluminum alloy plate 1, for example, Al—Cu-based (2000-based) alloy, Al—Si—Mg-based (6000-based) alloy, or Al—Zn—Mg-based (7000-based) alloy is preferably used, but other alloys with aluminum as its primary component may also be used, and there is no particular limitation regarding the specific composition.

There is no particular limitation on the type of plating to the applied to the plated steel plate 2, but zinc plating is used as a preferred example in this embodiment. Accordingly, in the ensuing explanation, the plated steel plate 2 is referred to as the zinc plated steel plate 2. Note that, as the zinc plating, a type in which the weight is within the range of 30 g/m² to 100 g/m² may be used.

There is no particular limitation in the metal composition of the zinc plated steel plate 2 and the non-plated steel plate 3 other than that they area steel. Moreover, the thickness of the zinc plated steel plate 2 and the non-plated steel plate 3 may be within the range of 0.3 mm or more and 4.0 mm or less, respectively.

As the adhesive 5, an epoxy-based adhesive is preferably used, and, for example, the adhesive manufactured by Cemedine Henkel (Product No.: EP185-4) can be used. This adhesive possesses conductivity, but the type of adhesive that can be used in the present invention is not limited thereto.

(1) Outline of Joining Method

Foremost, the specific processes of the joining method of this embodiment are explained. The three metal plates configured from the aluminum alloy plate 1, the zinc plated steel plate 2 and the non-plated steel plate 3 are joined as a result of being subject to the lapping step, pre-pressurization step, pre-heating step, cooling step, welding step, and adhesive hardening step described below.

(1-1) Lapping Step

Figure 1:
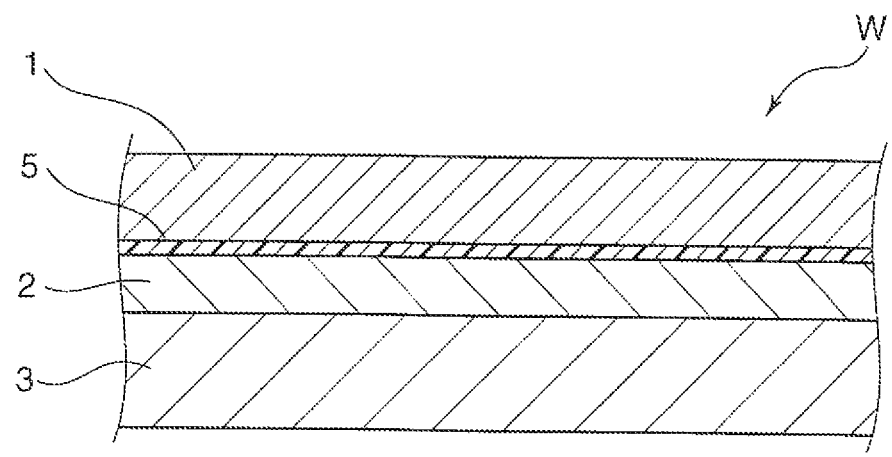
FIG. 1 is a diagram explaining the process of the lapping step.

In order to join the three metal plates 1 to 3, foremost, as shown in FIG. 1, a lapping step of lapping the respective metal plates 1 to 3 is performed. Specifically, the aluminum alloy plate 1 and the zinc plated steel plate 2 are lapped via an adhesive 5, and the non-plated steel plate 3 is lapped on an opposite surface of the zinc plated steel plate 2 to the aluminum alloy plate 1 (that is, the zinc plated steel plate 2 is clamped between the aluminum alloy plate 1 and the non-plated steel plate 3). Note that, as the adhesive 5, a thermosetting adhesive that hardens at a predetermined temperature or higher is used. Thus, the adhesive 5 is not hardened at the point of FIG. 1, and possesses a certain degree of fluidity. Moreover, while this kind of adhesive 5 is applied between the aluminum alloy plate 1 and the zinc plated steel plate 2, the adhesive 5 is not applied between the zinc plated steel plate 2 and the non-plated steel plate 3, and both steel plates 2, 3 are in direct contact with each other. In the ensuing explanation, the three metal plates 1 to 3 that are lapped as shown in FIG. 1 are collectively referred to as the "work W".

(1-2) Pre-pressurization Step

Subsequently, moving to FIG. 2, a pre-pressurization step of pressurizing the lapped metal plates 1 to 3 (work W) is performed. Specifically, in the pre-pressurization step, the work W is clamped between a pair of electrodes 7, 7 for spot welding, and the work W is pressurized with a predetermined pre-pressing force F0.

The electrodes 7, 7 form an approximately cylindrical shape, and are mounted on the tip of a joining gun that is operated by a work robot not shown. Subsequently, as a result of at least one of the electrodes 7, 7 being driven in the axial direction, the space between the two can be changed within a predetermined range. Moreover, the electrodes 7, 7 are connected to a power supply unit not shown, and current is applied between the electrodes 7, 7 according to the power feed from the power supply unit.

Figure 2:
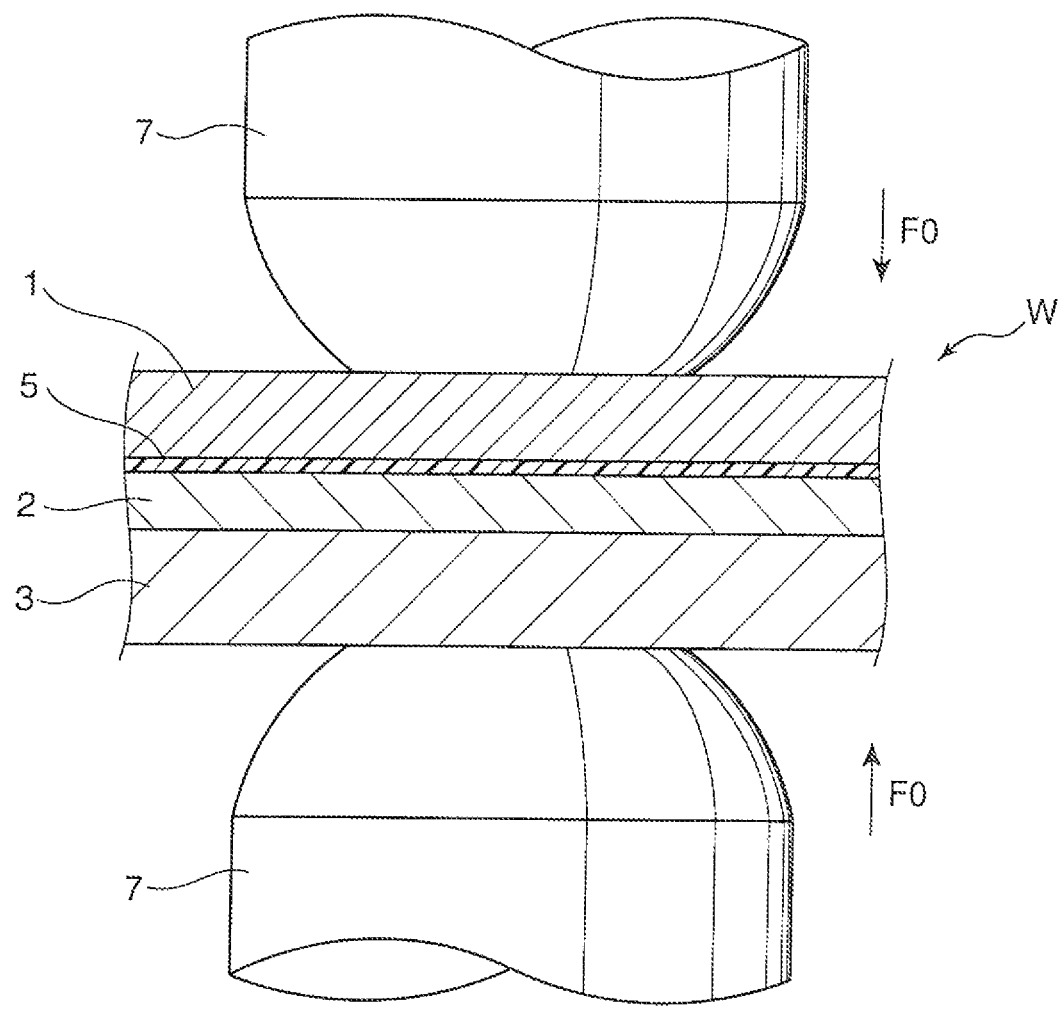
FIG. 2 is a diagram explaining the process of the pre-pressurization step.

The tip of the electrodes 7, 7 are formed such that the center part is formed in a planar shape and the periphery thereof is formed as a spherical tapered surface as shown in FIG. 2. Needless to say, the shape of the tip of the electrodes 7, 7 is not limited thereto, and, for example, the overall tip may be formed in a planar shape, or the overall tip may be formed in a convex spherical shape with a relatively large radius (that is, close to a flat surface) (refer to the electrodes of FIG. 8A to FIG. 8C used in the Examples described later).

(1-3) Pre-heating Step

Figure 3:
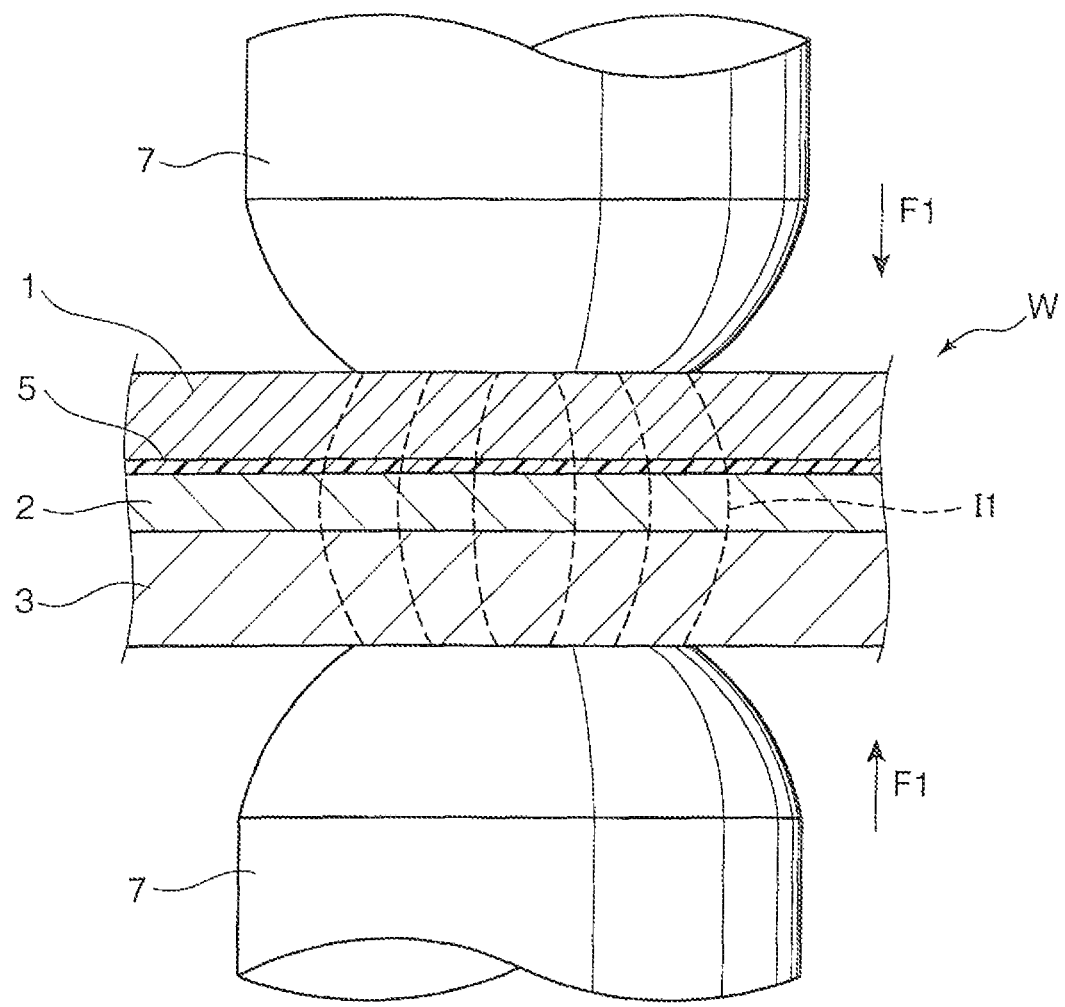
FIG. 3 is a diagram explaining the process of the pre-heating step.

Subsequently, moving to FIG. 3, a pre-heating step of passing current through the work W while applying pressure thereto is performed. Specifically, in the pre-heating step, while pressurizing the work W with the pair of electrodes 7, 7, voltage is applied to the electrodes 7, 7 from a power supply unit not shown and current of a predetermined first current value I1 is applied.

Upon pressurizing the work W at the pre-heating step, foremost, the pressing force at the start of said step is set to a first pressing force F1 of a value that is the same as or smaller than the pressing force F0 at the pre-pressurization step. Subsequently, pressurization with the first pressing force F1 may be continued until the end of the pre-heating step, or the first pressing force F1 may be increased to a second pressing force F2 described later (pressing force at the cooling step and the welding step) midway during the pre-heating step.

Moreover, the first current value I1 that is applied at the pre-heating step is set to a value (for example, 2 kA) that is smaller than the current value for welding (second current value I2 that is applied at the welding step described later). Thus, although the temperature of the work W will rise when the first current value I1 is applied, it will not rise to the melting point of metal. Note that the preferred range as the period of applying the first current value I1 is approximately 150 to 400 msec.

Based on the conduction of the first current value I1, the adhesive 5 at the portion that is clamped between the electrodes 7, 7 will soften and become fluidized in comparison to a state of the adhesive 5 being placed in room temperature.

(1-4) Cooling Step

Figure 4:
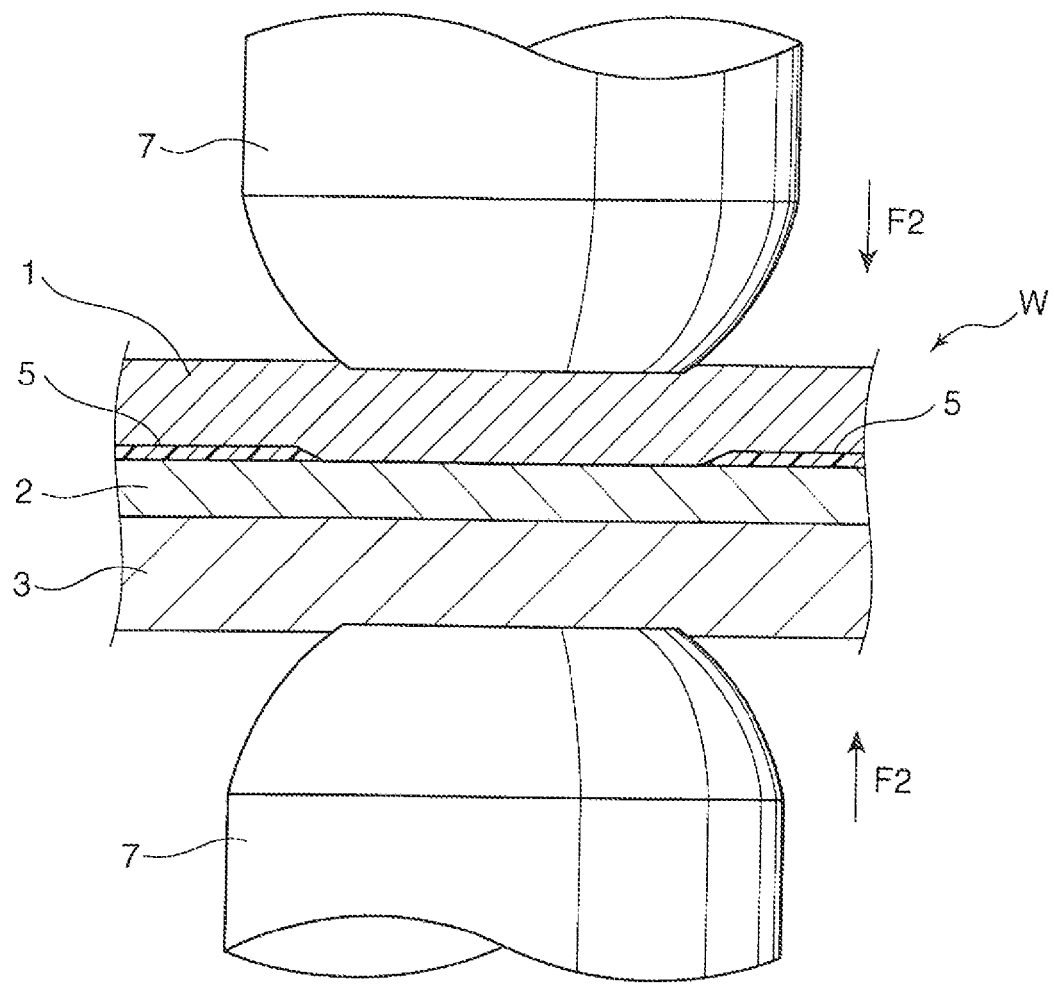
FIG. 4 is a diagram explaining the process of the cooling step.

Subsequently, moving to FIG. 4, a cooling step of pressurizing the work W while stopping the conduction between the electrodes 7, 7 is performed. Specifically, at the cooling step, in a state of stopping the conduction by setting the application voltage of the electrodes 7, 7 to zero, the work W is pressurized with a second pressing force F2 that is greater than the first pressing force F1 (pressing force at the start of the pre-heating step), and this pressurization is continued over a predetermined cooling time. In other words, the conduction between the electrodes 7, 7 is stopped so that the temperature of the work W will decrease than the temperature at the end of the pre-heating step, and the pressing force of the electrodes 7, 7 increases so that the adhesive 5 that was softened at the pre-heating step can be efficiently discharged from the part subjected to the pressurization (pressurized part) with the electrodes 7, 7. Note that the preferred range of the cooling time is approximately 300 to 1500 msec.

(1-5) Welding Step

Figure 5:
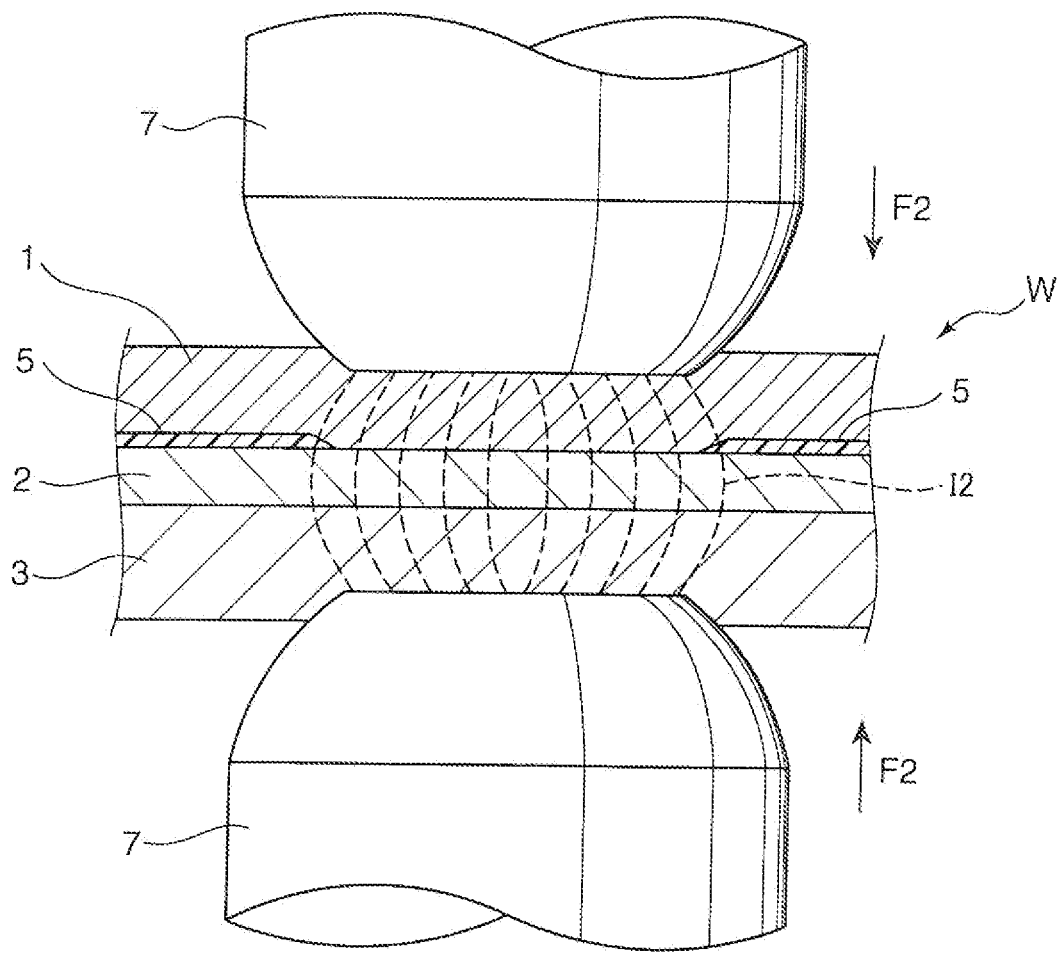
FIG. 5 is a diagram explaining the process of the welding step.

Subsequently, moving to FIG. 5, a welding step of performing spot welding to the work W is performed. Specifically, at the welding step, a second current value I2 that is greater than the current value I1 at the pre-heating step is applied while pressurizing the work W with a pressing force that is the same as the pressing force F2 at the cooling step.

The second current value I2 is set to a large current value capable of melting metal. In other words, as a result of the second current value I2 being applied, at the part clamped between the electrodes 7, 7, the temperature in the vicinity of the interface of the respective metal plates 1 to 3 will particularly increase, and the metal of such part will melt. However, if the second current value I2 is increased more than necessary, it may cause the phenomenon known as expulsion in which the melted metal scatters circumferentially. Thus, the second current value I2 needs to be set to a value (for example, around 14 kA) capable of reliably melting the metal and securing the joint strength, and which will not cause excessive expulsion. Note that the preferred range of the conducting period of the second current value I2 is approximately 150 to 400 msec.

Figure 6:
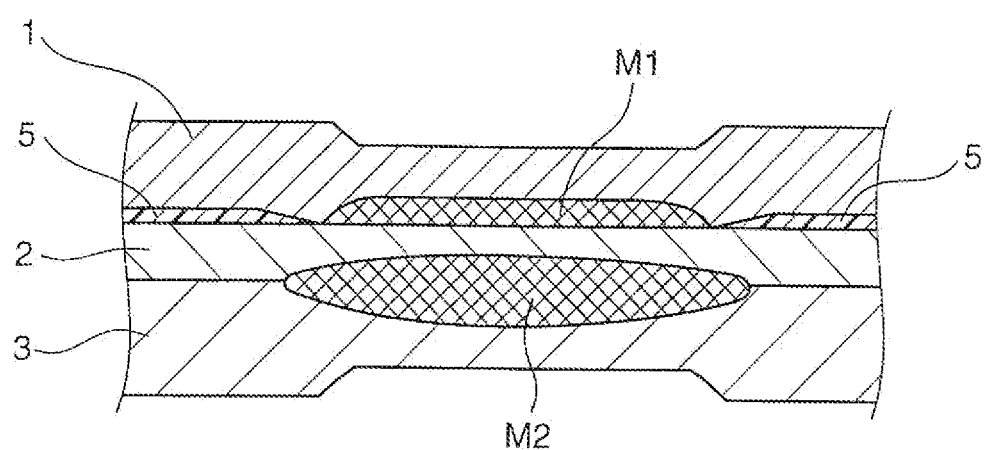
FIG. 6 is a diagram showing the cross section structure of the joined body obtained as a result of performing each of the steps.

When the foregoing conduction of the second current value I2 is complete, the location where the metal melted will re-solidify, and nugget parts M1, M2 as shown in FIG. 6 are formed. In other words, the nugget part M1 is formed at the contact part with the zinc plated steel plate 2 in the aluminum alloy plate 1, and the nugget part M2 is formed between the zinc plated steel plate 2 and the non-plated steel plate 3, and the respective metal plates 1 to 3 are mutually joined (welded) via the nugget parts M1, M2.

(1-6) Adhesive Hardening Step

Subsequently, an adhesive hardening step of hardening the adhesive 5 is performed. Specifically, the welded work W is placed in a heating furnace (not shown), and the temperature is raised to a hardening temperature of the adhesive 5 or higher. Consequently, the overall adhesive 5 will harden between the aluminum alloy plate 1 and the zinc plated steel plate 2, and the aluminum alloy plate 1 and the zinc plated steel plate 2 are caused to adhere via the hardened adhesive 5.

(2) Structure After Joining

The structure of the joined body that was joined as a result of being subject to the foregoing steps is now explained. After the joining, as described above, the aluminum alloy plate 1 and the zinc plated steel plate 2 are joined via the nugget part M1, and the zinc plated steel plate 2 and the non-plated steel plate 3 are joined via the nugget part M2. Moreover, the aluminum alloy plate 1 and the zinc plated steel plate 2 are caused to adhere with the adhesive 5 at a location other than the nugget part M1.

The nugget part M1 is created as a result of the aluminum alloy plate 1 being partially melted due to the resistance-caused heat based on the conduction of the second current value I2, the zinc plating layer of the surface of the zinc plated steel plate 2 being destroyed (diffused), and the newly-formed surfaces of the metals coming in contact with each other and being joined atomically. Note that, since the melting point of the aluminum alloy plate 1 is lower than the metal matrix of the zinc plated steel plate 2, a surface of the zinc plated steel plate 2 which faces to the aluminum alloy plate 1, except for the zinc plating layer, will not melt during the formation of the nugget part M1, and only the aluminum alloy plate 1 will melt.

The nugget part M2 is a result of both the zinc plated steel plate 2 and the non-plated steel plate 3 melting and re-solidifying due to the conduction of the second current value I2. As shown in FIG. 6, the nugget part M2 is formed to face the nugget part M1 of the aluminum alloy plate 1 and at a position where it will not come in contact with the aluminum alloy plate 1.

FIG. 7 is a diagram schematically showing the structure of the interface of the aluminum alloy plate 1 and the zinc plated steel plate 2. As shown in FIG. 7, the interface of both of the metal plates 1, 2 can be divided into areas S1, S2, S3, S4 in order from the center of the pressurized part by the electrodes 7, 7.

The areas S1, S2 correspond to the formation parts of the nugget part M1 (that is, the parts where the aluminum alloy plate 1 melts and re-solidifies). Among the above, a thermolysis product 5a resulting from the thermal decomposition of the adhesive 5 remains in the area S1 that is positioned at the center side in the radial direction as shown with the enlarged view of part "a". Meanwhile, the area S2 of an annular shape is formed in the radial direction that is outside of the area S1 in a planar view (viewed from the lapping direction of the metal plates), but the foregoing thermolysis product 5a hardly exists in the area S2 as shown in the enlarged view of part "b", and the metals are firmly joined. In other words, both of the areas S1, S2 are joined surfaces that are welded corresponding to the nugget part M1, but the joint strength of the area S2 on the outside is greater than the area S1 at the center side depending on the existence of the thermolysis product 5a of the adhesive 5. In the ensuing explanation, the area S1 is referred to as the incomplete welded part S1 and the area S2 is referred to as the complete welded part S2.

The reason why the thermolysis product 5a of the adhesive 5 remains in the incomplete welded part S1 as described above is considered to be because the discharge force that works on the adhesive 5 corresponding to the center part of the electrodes 7, 7 is relatively weak. For example, if those having the same shown in FIG. 2 to FIG. 5 (those with a flat tip) are used as the electrodes 7, 7, although the adhesive 5 corresponding to the outside portion in the radial direction of the electrodes 7, 7 will be reliably discharged circumferentially, the discharge force will not sufficiently work on the adhesive 5 corresponding to the center part of the electrodes 7, 7, and the adhesive 5 of such part is considered to partially remain. In other words, upon receiving the pressing force from the electrodes 7, 7, although the adhesive 5 is mainly discharged from the center part of the electrodes 7, 7 toward the outside in the radial direction, since there is also the adhesive 5 which contrarily moves from the outside in the radial direction of the electrodes 7, 7 toward the center part, the discharge force will not sufficiently work on the adhesive 5 corresponding to the center part of the electrodes 7, 7, and the adhesive 5 tends to remain.

Areas S3, S4 exist further outside of the incomplete welded part S1 and the complete welded part S2. The area S3 is an area where the thickness of the layer of the adhesive 5 is thin as a result of being influenced by the pressurization and conduction of the electrodes 7, 7. Meanwhile, the area S4 is an area in which a constant layer of the adhesive 5 that is thicker than the area S3 exists as a result of not being influenced by the electrodes 7, 7. Thus, the adhesive strength of the area S3 is weaker than the adhesive strength of the area S4. In the ensuing explanation, the area S3 is referred to as the weak adhesive part S3 and the area S4 is referred to as the adhesive part S4.

Note that, as the correlation between the joint structure (FIG. 7) of this embodiment explained above and the invention pertaining to the present claims, the incomplete welded part S1 corresponds to the "weak joint part" of the present invention, the complete welded part S2 corresponds to the "first joint part" of the present invention, and the adhesive part S4 corresponds to the "second joint part" of the present invention.

(3) EXPERIMENTS

Results of the experiments that were conducted in order to confirm the effects of this embodiment are now explained. Specifically, in the experiments, metal plates were actually joined with the joining method (FIG. 1 to FIG. 5) explained in (1) above, and the joint strength of the thus obtained joined bodies was measured with the L-shaped peeling off test (refer to FIG. 9).

(3-1) Experimental Conditions

Figure 8A:
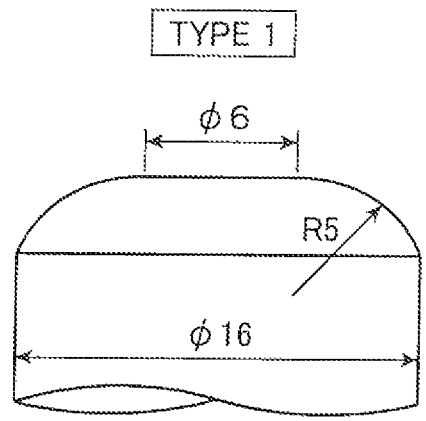
Figure 8B:
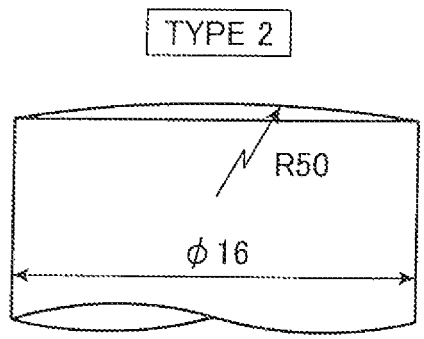
Figure 8C:
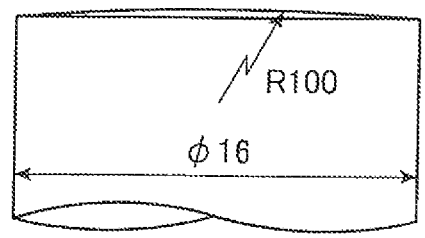

FIG. 8A to FIG. 8C are diagram showing the shape of the electrode 7 that was used in the experiments. The type 1 electrode shown in FIG. 8A has the same shape as the electrode 7 shown in FIG. 2 to FIG. 5, and the diameter of the overall electrode is 16 mm, the diameter of the planar portion formed at the tip thereof is 6 mm, and the radius of the circumferential spherical portion thereof is 5 mm With the type 2 electrode shown in FIG. 8B, the overall tip thereof is formed in a convex spherical shape, and its radius is 50 mm With the type 3 electrode shown in FIG. 8C, the overall tip thereof is formed in a convex spherical shape, and its radius is 100 mm.

As shown in the Examples and Comparative Examples described later, the electrode 7 that is used in the experiments is, in most cases, the type 1 electrode shown in FIG. 8A. Note that, only in the cases of Examples 10 and 11, the type 2 and type 3 electrodes are used as the electrode 7 on the side to come in contact with the non-plated steel plate 3, but the electrode on the side to come in contact with the aluminum alloy plate 1 is the type 1 electrode in both cases.

Figure 9:
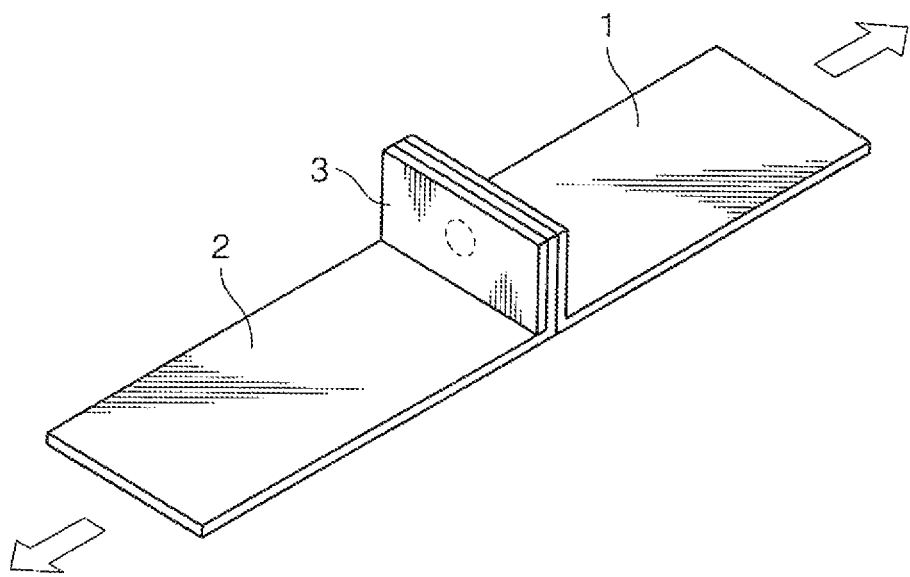
FIG. 9 is a diagram explaining the method of conducting the experiment for measuring the peel strength.

The electrodes 7, 7 shown in FIG. 8 were used to join three metal plates configured from the aluminum alloy plate 1, the zinc plated steel plate 2, and the non-plated steel plate 3 into the shape shown in FIG. 9. The strength of the joint part was measured by pulling the thus obtained joined body until it peeled off (L-shaped peeling off test). Note that the thickness of the aluminum alloy plate 1 used in the experiments was 1.2 mm, the thickness of the zinc plated steel plate 2 was 0.8 mm, and the thickness of the non-plated steel plate 3 was 1.6 mm. This is common to all cases of the Examples and Comparative Examples described later.

FIG. 10 to FIG. 18 show the results upon respectively joining the metal plates 1 to 3 under different joining conditions and measuring the strength of the obtained joined bodies with the foregoing L-shaped peeling off test (FIG. 9). Note that FIG. 10 is a table that summarizes the respective joining conditions and the measurement results of the L-shaped peeling off test, and FIG. 11 to FIG. 18 are time charts showing the respective joining conditions in a time series.

In the table of FIG. 10 and the time charts of FIG. 11 to FIG. 18, Examples 1 to 11 shows the cases of joining the metal plates 1 to 3 according to the joining method (processes shown in FIG. 1 to FIG. 5) of the present invention, and Comparative Examples 1 and 2 show cases of joining based on processes that are different from the present invention. Note that, in FIG. 10 to FIG. 18, the time of the respective steps is shown as the number of cycles (cyc) of the power source. Since a power source of 60 Hz is used in the experiments, for example, if 15 cyc is represented in seconds, 15/60=0.25 sec (250 msec). In FIG. 10, the time of the respective steps is shown in both the number of cycles (cyc) and number of seconds (msec). Moreover, the value of the peel strength shown in FIG. 10 is a relative value when the strength of Example 1 is 1.0.

The joining conditions of Examples 1 to 11 are now explained in detail.

Example 1

The joining conditions of Example 1 are as shown in FIG. 10 and FIG. 11. In other words, in Example 1, foremost, as the pre-pressurization step, a pressing force of 2 kN is applied for 60 cyc (1000 msec). Subsequently, as the pre-heating step, while continuing the pressurization at 2 kN, a current of 2 kA is applied for 15 cyc (250 msec). Subsequently, as the cooling step, a pressing force of 7 kN is applied for 60 cyc (1000 msec) in a state where the conduction is stopped. Finally, as the welding step, while continuing the pressurization at 7 kN, a current of 14 kA is applied for 18 cyc (300 msec). Note that, in this Example, the type 1 electrode (FIG. 8A) was used as the electrode 7 on the aluminum side (side to come in contact with the aluminum alloy plate 1), and the type 1 electrode was also used as the electrode 7 on the steel plate side (side to come in contact with the non-plated steel plate 3).

Example 2

In Example 2, foremost, as the pre-pressurization step, a pressing force of 2 kN is applied for 60 cyc (1000 msec). Subsequently, as the pre-heating step, a current of 2 kA is applied for 15 cyc (250 msec). Here, while the pressing force is set to 2 kN for 10 cyc (167 msec) from the start of the pre-heating step, the pressing force is set to 7 kN for the subsequent 5 cyc (83 msec). Subsequently, as the cooling step, a pressing force of 7 kN is applied for 60 cyc (1000 msec) in a state where the conduction is stopped. Finally, as the welding step, while continuing the pressing force of 7 kN, a current of 14 kA is applied for 18 cyc (300 msec). Note that the electrode 7 that is used in this Example is the type 1 electrode (FIG. 8A) for both the aluminum side and the steel plate side.

Example 3

With respect to the joining conditions of Example 3, although the timing of pressurization and conduction is the same as Example 1, what is different from Example 1 is that the pressing force during the cooling step and the welding step is set to 5 kN, and the conduction current during the welding step is set to 13 kA. Note that the electrode 7 that is used in this Example is the type 1 electrode (FIG. 8A) for both the aluminum side and the steel plate side.

Example 4

Figure 12:
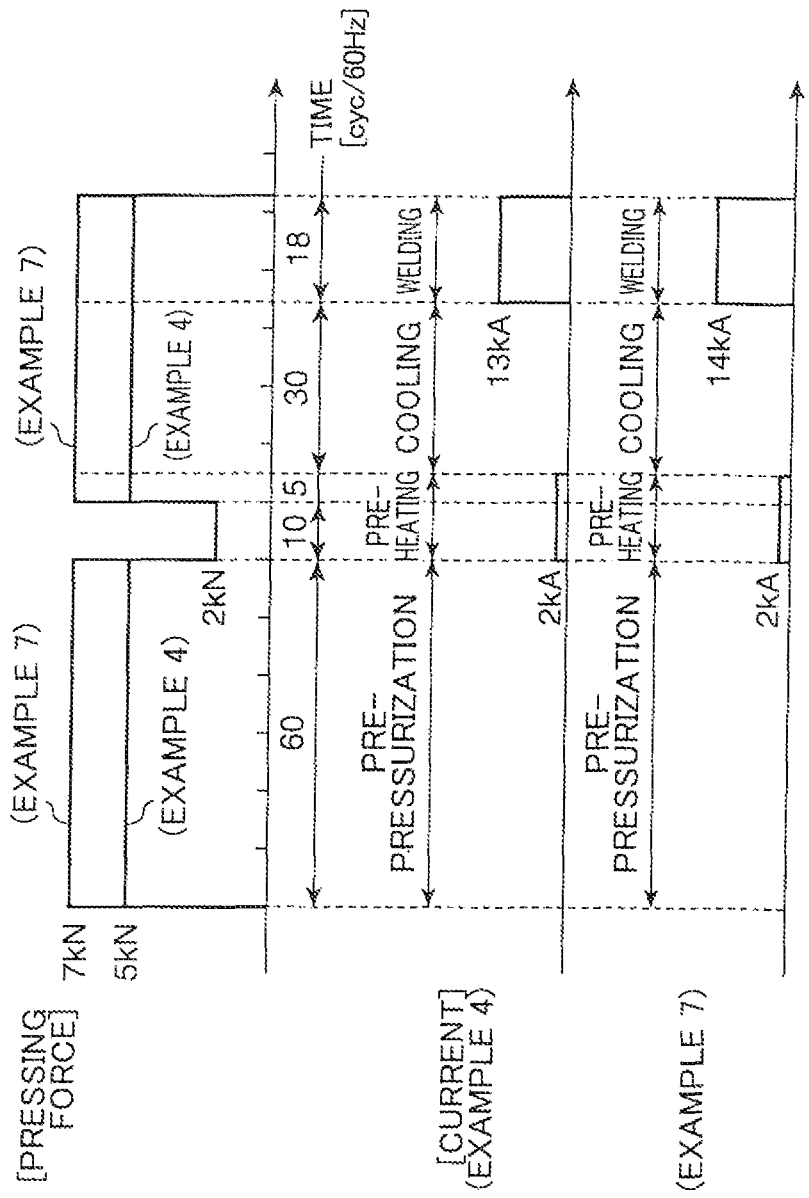
FIG. 12 is a time chart showing the joining conditions of Examples 4 and 7.

The joining conditions of Example 4 are as shown in FIG. 10 and FIG. 12. In other words, in Example 4, foremost, as the pre-pressurization step, a pressing force of 5 kN is applied for 60 cyc (1000 msec). Subsequently, as the pre-heating step, a current of 2 kA is applied for 15 cyc (250 msec). Here, a pressing force of 2 kN is applied for 10 cyc (167 msec) from the start of the pre-heating step, and the pressing force is set to 5 kN for the subsequent 5 cyc (83 msec). Subsequently, as the cooling step, a pressing force of 5 kN is applied for 30 cyc (500 msec) in a state where the conduction is stopped. Finally, as the welding step, while continuing the pressurization at 5 kN, a current of 13 kA is applied for 18 cyc (300 msec). Note that the electrode 7 that is used in this Example is the type 1 electrode (FIG. 8A) for both the aluminum side and the steel plate side.

Example 5

Figure 13:
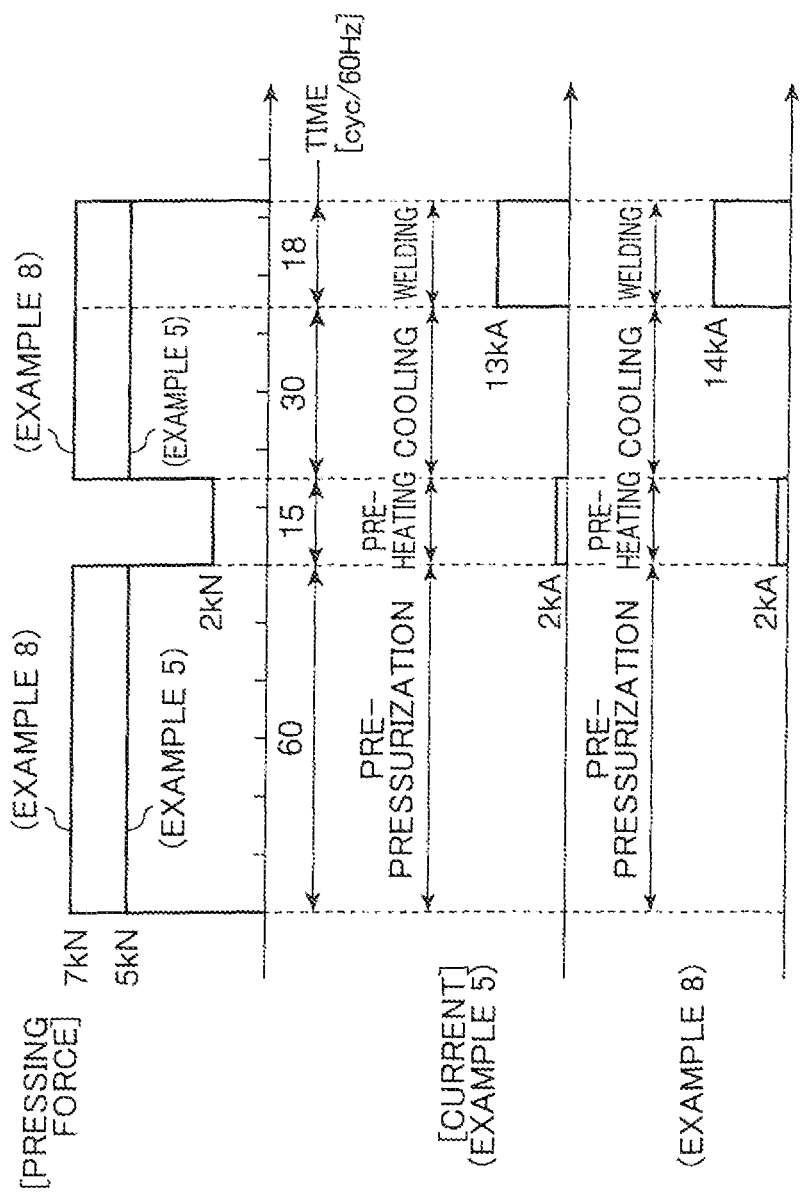
FIG. 13 is a time chart showing the joining conditions of Examples 5 and 8.

The joining conditions of Example 5 are as shown in FIG. 10 and FIG. 13. In other words, in Example 5, foremost, as the pre-pressurization step, a pressing force of 5 kN is applied for 60 cyc (1000 msec). Subsequently, as the pre-heating step, while applying a pressing force of 2 kN, a current of 2 kA is applied for 15 cyc (250 msec). Subsequently, as the cooling step, a pressing force of 5 kN is applied for 30 cyc (500 msec) in a state where the conduction is stopped. Finally, as the welding step, while continuing the pressurization at 5 kN, a current of 13 kA is applied for 18 cyc (300 msec). Note that the electrode 7 that is used in this Example is the type 1 electrode (FIG. 8A) for both the aluminum side and the steel plate side.

Example 6

Figure 14:
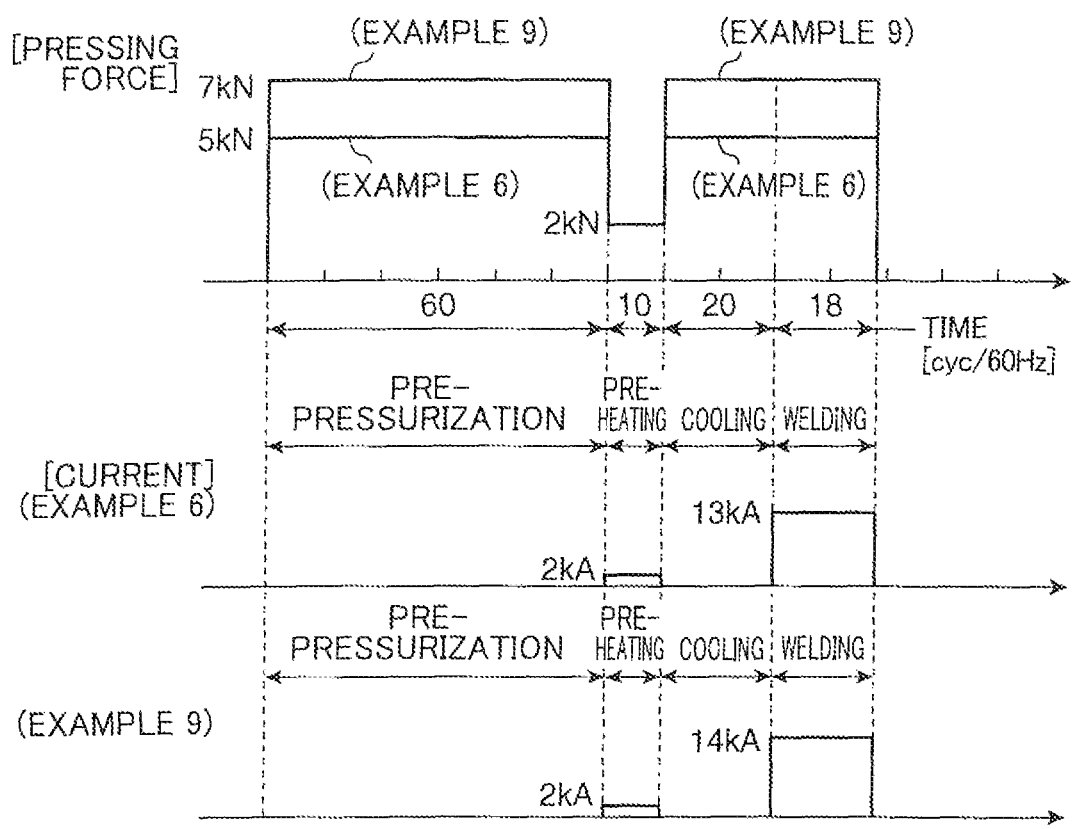
FIG. 14 is a time chart showing the joining conditions of Examples 6 and 9.

The joining conditions of Example 6 are as shown in FIG. 10 and FIG. 14. In other words, in Example 6, foremost, as the pre-pressurization step, a pressing force of 5 kN is applied for 60 cyc (1000 msec). Subsequently, as the pre-heating step, while applying a pressing force of 2 kN, a current of 2 kA is applied for 10 cyc (167 msec). Subsequently, as the cooling step, a pressing force of 5 kN is applied for 20 cyc (333 msec) in a state where the conduction is stopped. Finally, as the welding step, while continuing the pressurization at 5 kN, a current of 13 kA is applied for 18 cyc (300 msec). Note that the electrode 7 that is used in this Example is the type 1 electrode (FIG. 8A) for both the aluminum side and the steel plate side.

Example 7

With respect to the joining conditions of Example 7, as shown in FIG. 10 and FIG. 12, the timing of pressurization and conduction is the same as Example 4. However, what is different from Example 4 is that the pressing force other than during the pre-heating step is set to 7 kN, and the conduction current during the welding step is set to 14 kA. Note that the electrode 7 that is used in this Example is the type 1 electrode (FIG. 8A) for both the aluminum side and the steel plate side.

Example 8

With respect to the joining conditions of Example 8, as shown in FIG. 10 and FIG. 13, the timing of pressurization and conduction is the same as Example 5. However, what is different from Example 5 is that the pressing force other than during the pre-heating step is set to 7 kN, and the conduction current during the welding step is set to 14 kA. Note that the electrode 7 that is used in this Example is the type 1 electrode (FIG. 8A) for both the aluminum side and the steel plate side.

Example 9

With respect to the joining conditions of Example 9, as shown in FIG. 10 and FIG. 14, the timing of pressurization and conduction is the same as Example 6. However, what is different from Example 6 is that the pressing force other than during the pre-heating step is set to 7 kN, and the conduction current during the welding step is set to 14 kA. Note that the electrode 7 that is used in this Example is the type 1 electrode (FIG. 8A) for both the aluminum side and the steel plate side.

Example 10

Figure 15:
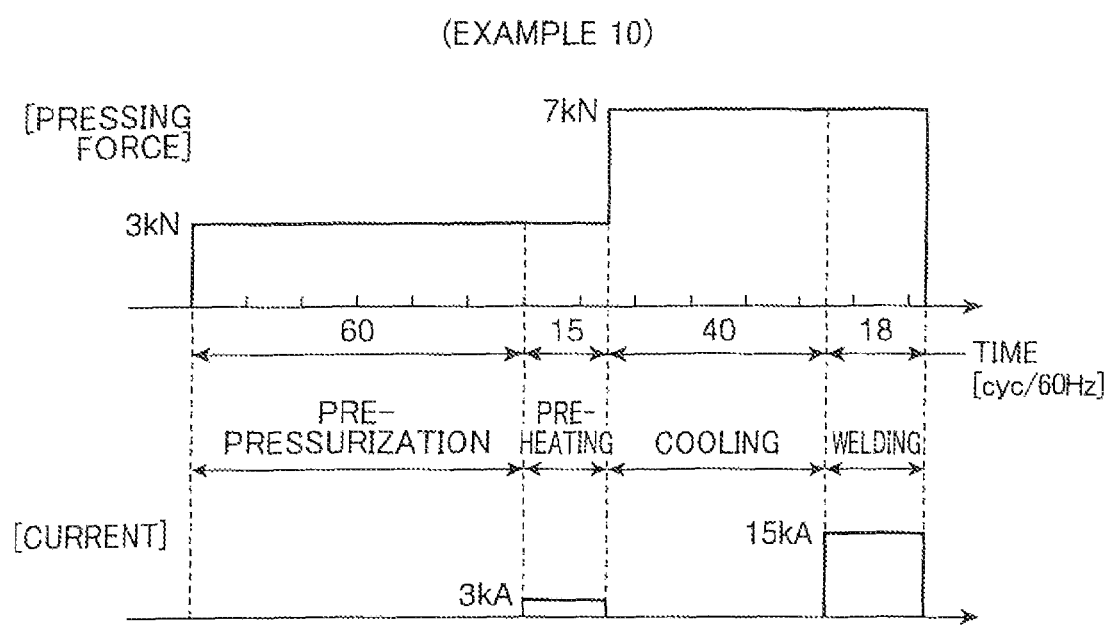
FIG. 15 is a time chart showing the joining conditions of Example 10.

The joining conditions of Example 10 are as shown in FIG. 10 and FIG. 15. In other words, in Example 10, foremost, as the pre-pressurization step, a pressing force of 3 kN is applied for 60 cyc (1000 msec). Subsequently, as the pre-heating step, while continuing the pressurization at 3 kN, a current of 3 kA is applied for 15 cyc (250 msec). Subsequently, as the cooling step, a pressing force of 7 kN is applied for 40 cyc (667 msec) in a state where the conduction is stopped. Finally, as the welding step, while continuing the pressurization at 7 kN, a current of 15 kA is applied for 18 cyc (300 msec). Note that, in this Example, while the type 1 electrode (FIG. 8A) was used as the electrode 7 on the aluminum side, the type 2 electrode (FIG. 8B) was used as the electrode 7 on the steel plate side.

Example 11

Figure 16:
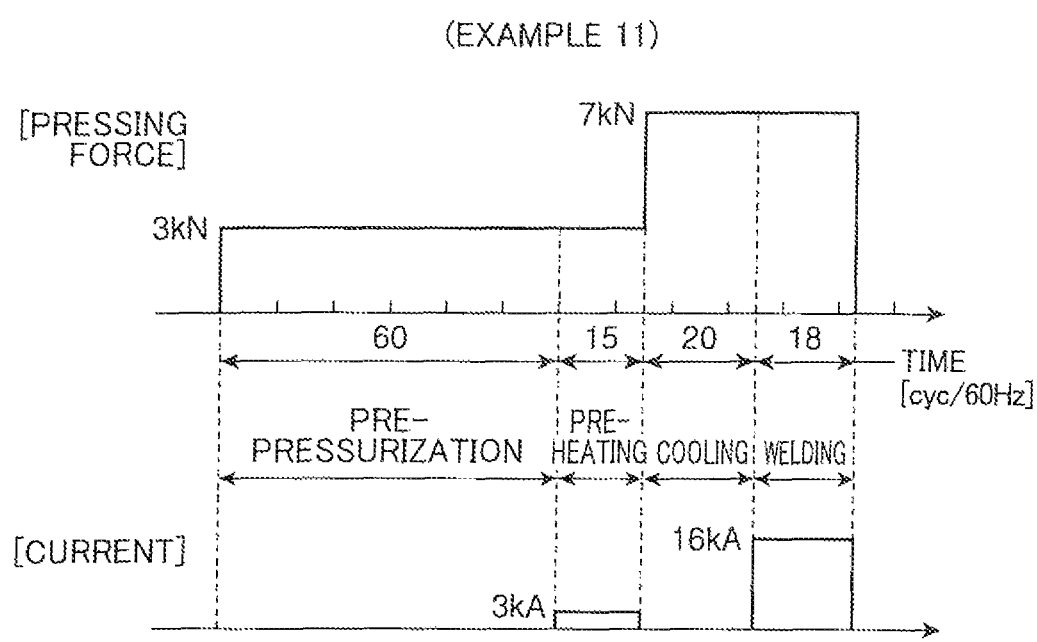
FIG. 16 is a time chart showing the joining conditions of Example 11.

The joining conditions of Example 11 are as shown in FIG. 10 and FIG. 16. In other words, in Example 11, foremost, as the pre-pressurization step, a pressing force of 3 kN is applied for 60 cyc (1000 msec). Subsequently, as the pre-heating step, while continuing the pressurization at 3 kN, a current of 3 kA is applied for 15 cyc (250 msec). Subsequently, as the cooling step, a pressing force of 7 kN is applied for 20 cyc (333 msec) in a state where the conduction is stopped. Finally, as the welding step, while continuing the pressurization at 7 kN, a current of 16 kA is applied for 18 cyc (300 msec). Note that, in this Example, while the type 1 electrode (FIG. 8A) was used as the electrode 7 on the aluminum side, the type 3 electrode (FIG. 8C) was used as the electrode 7 on the steel plate side.

When the joining conditions of Examples 1 to 11 explained above are applied to the respective values of the pre-pressing force F0, the first pressing force F1, the second pressing force F2, the first current value I1, and the second current value I2 in the joining processes of FIG. 1 to FIG. 5 described above, the joining conditions of the respective Examples can be represented as follows:

Examples 1 and 2 . . . pre-pressing force F0=2 kN, first pressing force F1=2 kN, second pressing force F2=7 kN, first current value I1=2 kA, second current value I2=14 kA Example 3 . . . pre-pressing force F0=2 kN, first pressing force F1=2 kN, second pressing force F2=5 kN, first current value I1=2 kA, second current value I2=13 kA Example 4 to 6 . . . pre-pressing force F0=5 kN, first pressing force F1=2 kN, second pressing force F2=5 kN, first current value I1=2 kA, second current value I2=13 kA Example 7 to 9 . . . pre-pressing force F0=7 kN, first pressing force F1=2 kN, second pressing force F2=7 kN, first current value I1=2 kA, second current value I2=14 kA Example 10 . . . pre-pressing force F0=3 kN, first pressing force F1=3 kN, second pressing force F2=7 kN, first current value I1=3 kA, second current value I2=15 kA Example 11 . . . pre-pressing force F0=3 kN, first pressing force F1=3 kN, second pressing force F2=7 kN, first current value I1=3 kA, second current value I2=16 kA.

The joining conditions of Comparative Examples 1 and 2 are now explained.

Comparative Example 1

Figure 17:
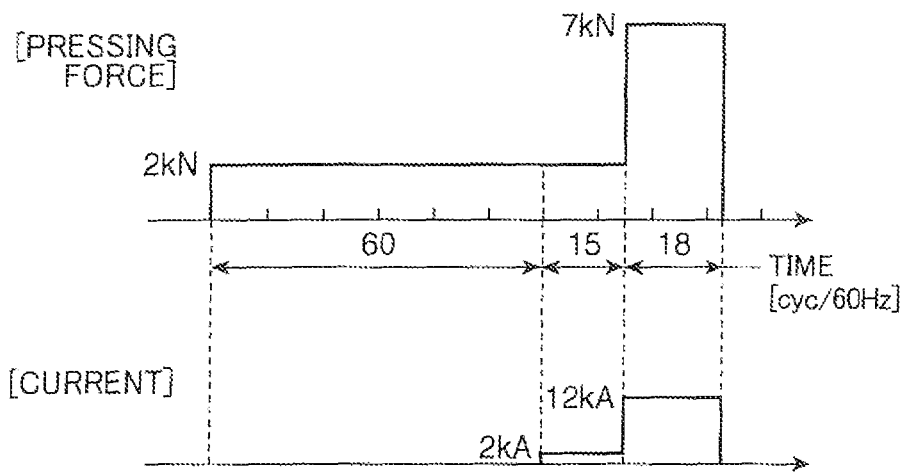
FIG. 17 is a time chart showing the joining conditions of Comparative Example 1.

The joining conditions of Comparative Example 1 are as shown in FIG. 10 and FIG. 17. In other words, in Comparative Example 1, foremost, a pressing force of 2 kN is applied for 60 cyc (1000 msec). Subsequently, while continuing the pressurization at 2 kN, a current of 2 kA is applied for 15 cyc (250 msec). Finally, while applying a pressing force of 7 kN, a current of 12 kA is applied for 18 cyc (300 msec). As can be understood from the foregoing conditions, in Comparative Example 1, conduction of 2 kA and conduction of 12 kA are respectively performed as steps corresponding to the pre-heating step and the welding step in each of the Examples. However, there is no period (cooling step) of stopping the conduction between the two steps. Note that the electrode 7 that is used in this Comparative Example is the type 1 electrode (FIG. 8A) for both the aluminum side and the steel plate side.

Comparative Example 2

Figure 18:
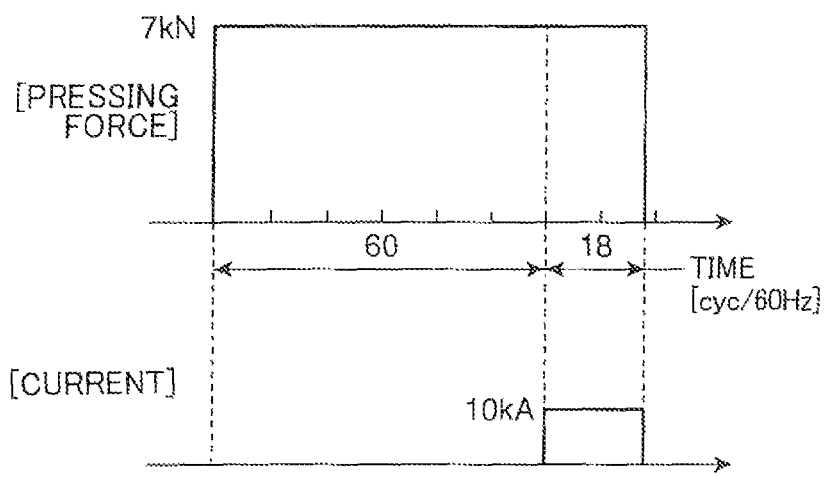
FIG. 18 is a time chart showing the joining conditions of Comparative Example 2.

The joining conditions of Comparative Example 2 are as shown in FIG. 10 and FIG. 18. In other words, in Comparative Example 2, after applying a pressing force of 7 kN for 60 cyc (1000 msec), while continuing such pressurization, a current of 10 kA is applied for 18 cyc (300 msec). As can be understood from the foregoing conditions, in Comparative Example 2, there are no steps corresponding to the pre-heating step and the cooling step in each of the Examples. Note that the electrode 7 that is used in this Example is the type 1 electrode (FIG. 8A) for both the aluminum side and the steel plate side.

(3-2) Experimental Results

Upon comparing the measurement results of the peel strength shown in FIG. 10, when the peel strength of Comparative Example 1 is 1.0, the peel strength of Examples 1 to 11 is a value within the range of 2.7 to 3.0 in all cases, and it is evident that extremely high joint strength is obtained. Meanwhile, with Comparative Example 2 which does not include the steps corresponding to the pre-heating step and the cooling step, the peel strength is extremely low at 0.2, and only strength of approximately $\frac{1}{15}$ in comparison to each of the Examples is obtained. As described above, according to the joining conditions of each of the Examples, it has been confirmed that extremely high joint strength can be obtained in comparison to conventional technology. Moreover, as the structure of the joint parts that were joined with the methods of Examples 1 to 11, the same structure as the structure shown in FIG. 6 and FIG. 7 was obtained in all cases.

The reason why the joint strength was low in Comparative Examples 1 and 2 is because the discharge of the adhesive 5 was insufficient, and, as a result of the welding current being applied in a state where the material was not sufficiently cooled (that is, in a state where the electrical resistance is large), the resistance-caused heat quantity tends to become excessive, and it is not possible to sufficiently increase the welding current. In fact, the welding current (12 kA or 10 kA) of Comparative Examples 1 and 2 is lower than the welding current value (13 to 16 kA) of Examples 1 to 11. However, if the welding current is increased any more, the phenomenon referred to as expulsion where the base material scatters occurred, and a favorable welded structure could not be obtained.

(4) Summary

As evident from the foregoing experimental results, according to the joining method of this embodiment, there is an advantage in that dissimilar metals including the aluminum alloy plate 1 and the zinc plated steel plate 2 can be joined firmly.

In other words, with the foregoing embodiment, prior to applying a high current for welding to the work W, since a pre-heating step of pressurizing and passing current through the work W with electrodes 7, 7 is performed, the adhesive 5 between the aluminum alloy plate 1 and the zinc plated steel plate 2 can be sufficiently softened with the warm-up effect based on conduction, while keeping the temperature of the work W to be within a range that is less than the melting point. Moreover, in the subsequent cooling step, by applying a higher pressing force in a state where the conduction is stopped, the discharge of the adhesive 5 that was softened at the pre-heating step can be promoted, and the temperature of the work W can be reduced, and moreover it is further possible to cause the metals to sufficiently fit each other. Consequently, the electrical resistance of the material (in particular the interface resistance of the aluminum alloy plate 1 and the zinc plated steel plate 2) is effectively reduced, and, even if a high welding current is applied from the electrodes 7, 7, excessive resistance-caused heat quantity will not arise, and the phenomenon (expulsion) in which the base material scatters during the welding process is inhibited. Thus, it is possible to apply a higher welding current while securing favorable weldability, and the joint strength can be effectively improved.

Figure 20:
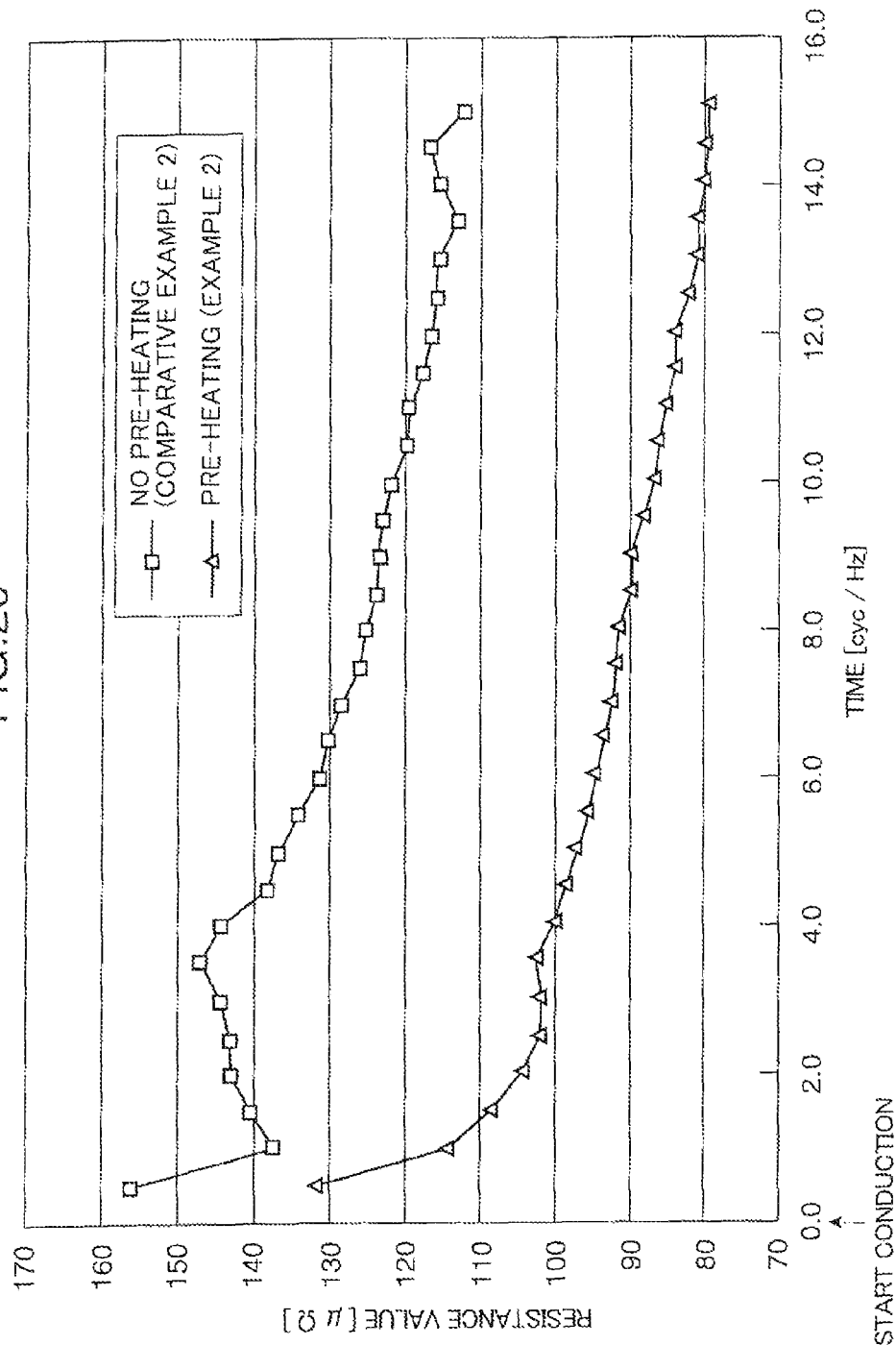
FIG. 20 is a graph showing the changes in the electrical resistance value during the welding in Example 2 and Comparative Example 2.

FIG. 20 is a graph that demonstrates the operation and effect described above. Specifically, the graph of FIG. 20 shows the change in resistance during the welding step upon applying a constant current in the case of performing and not performing the pre-heating step. The waveform shown with the Δ (triangle) mark in the graph shows the change in the resistance value in Example 2 in which the pre-heating step is performed, and the waveform shown with the □ (square) mark shows the change in the resistance value in Comparative Example 2 in which the pre-heating step is not performed. As evident from the graph, with Example 2 which performs the pre-heating step prior to the welding step, the resistance value is lower throughout the start to end of conduction in comparison to Comparative Example 2 which does not perform the pre-heating step. This does not depend on the application of the adhesive to the interface of the aluminum alloy plate 1 and the zinc plated steel plate 2. Accordingly, it has been confirmed that, if the fitting of the materials is improved with the pre-heating step, it is possible to reduce the contact resistance and increase the conduction current, and thereby improve the weldability.

Note that, in this embodiment, after the lapping step of lapping the metal plates 1 to 3, as the pre-pressurization step, the work W configured from the metal plates 1 to 3 is clamped between the electrodes 7, 7 and pressurized over a predetermined time, and, subsequently, as the pre-heating step, a predetermined current (first current value I1 is applied while pressurizing the work W. However, if possible, the pre-pressurization step may be omitted, and the pressurization of the work W and the conduction of the first current value I1 may be started approximately simultaneously. Nevertheless, to proceed to the pre-heating step in a state where the work W is pressurized in advance based on the pre-pressurization step is more advantageous in that the conduction current is stabilized and an appropriate warm-up effect is obtained.

In particular, as with Examples 4 to 9, if the pressing force (pre-pressing force F0) of the electrodes 7, 7 at the pre-pressurization step is set to be greater than the pressing force (first pressing force F1) at the start of the pre-heating step, since it is possible to actively discharge the adhesive 5 from the pressurized part based on the electrodes 7, 7 even during the pre-pressurization step, when combined with the effects of the subsequent pre-heating step and the cooling step, the adhesive 5 can be discharged from the pressurized part more reliably, and the weldability of the aluminum alloy plate 1 and the zinc plated steel plate 2 can be further improved. Moreover, since the discharge force of the adhesive 5 is improved, there is an advantage in that sufficient joint strength can be secured even if the time spent on the pre-heating step and the cooling step is shortened a certain degree.

For example, the time of the cooling step in Examples 4 to 9 is set to 20 cyc or 30 cyc that is shorter than the time (60 cyc) of the cooling step in Examples 1 to 3, and the time of the pre-heating step in Examples 6 and 9 is set to 10 cyc that is shorter than the time (15 cyc) of the pre-heating step in Examples 1 to 3. Meanwhile, the peel strength is within the range of 2.7 to 3.0 in both Examples 1 to 3 and Examples 4 to 9. In other words, upon comparing Examples 4 to 9 and Examples 1 to 3, it is evident that Examples 4 to 9 are able to obtain approximately the same level of peel strength as Examples 1 to 3 even though the time of the pre-heating step and/or the cooling step is shorted in Examples 4 to 9. This is considered to be because, since Examples 4 to 9 have a greater pressing force (pre-pressing force F0) at the pre-pressurization step, they are able to obtain sufficient peel strength due to the foregoing reasons, even if the time of the pre-heating step and/or the cooling step is short.

Moreover, although the foregoing embodiment used an electrode as shown in FIG. 2 to FIG. 5 or FIG. 8 as the electrodes 7, 7, the shape of usable electrodes is not limited thereto. However, the use of an electrode shape in which the contact area with the metal plate becomes excessively small should be avoided. For example, in the case of using an electrode in which the tip thereof is formed in a convex spherical shape as shown in FIG. 8B and FIG. 8C, if the radius of the tip part is reduced unnecessarily (that is, if the tip becomes pointed), the contact area of the electrode and the metal plate will become excessively small, and there is a possibility that it may not be possible to obtain the sufficient joint strength as obtained in this embodiment.

In other words, as with the foregoing embodiment, if an electrode with a relatively large contact area with the metal plate is used as the electrodes 7, 7, while the adhesive 5 corresponding to the center part of the electrodes 7, 7 cannot be discharged sufficiently, the adhesive 5 corresponding to the outer portion in the radial direction of the electrodes 7, 7 can be reliably discharged circumferentially. Consequently, as shown in FIG. 7, the incomplete welded part S1 with the thermolysis product 5a of the adhesive 5 remaining therein and the complete welded part S2 with hardly any thermolysis product 5a remaining therein will be formed concentrically between the aluminum alloy plate 1 and the zinc plated steel plate 2. In other words, the complete welded part S2 with high joint strength is formed in an annular shape, and the incomplete welded part S1 with weak joint strength is formed at the center side thereof. Consequently, since the outside diameter of the complete welded part S2 with high joint strength is enlarged, there is an advantage in that it is possible to build a joint structure that is resistant to bending and twisting and with superior fatigue strength.

Meanwhile, if an electrode with a small contact area with the metal plate is used, the discharge area of the adhesive 5 will be concentrated at the center part of the electrode, and it is considered that a joint part with a solid circular shape will be formed. Consequently, in comparison to the case of the foregoing embodiment, the outside diameter of the joint part will be small, and there is a possibility that sufficient joint strength cannot be obtained. Accordingly, by forming the complete welded part S2 of an annular shape using an electrode with a large contact area with the metal plate as with the foregoing embodiment, there is an advantage in that higher joint strength can be obtained.

Moreover, among the type 1 electrode to the type 3 electrode shown in FIG. 8A to FIG. 8C, as a more preferable combination of electrodes, as shown in Examples 10 and 11, the type 1 electrode may be used on the aluminum side (side to come in contact with the aluminum alloy plate 1) and the type 2 or type 3 electrode may be used on the steel plate side (side to come in contact with the non-plated steel plate 3). In other words, upon comparing Example 1 and Examples 10 and 11, it is evident that Examples 10 and 11 that use the type 1 electrode on the aluminum side and use the type 2 or type 3 electrode on the steel plate side are able to obtain the exact same peel strength (3.0) even though the time of the cooling step is shorter in comparison to Example 1 which uses the type 1 electrode on both the aluminum side and the steel plate side. Thus, it could be said that the combination of the electrodes in Examples 10 and 11 is able to obtain the same level of joint strength with a shorter cooling time.

Figure 19:
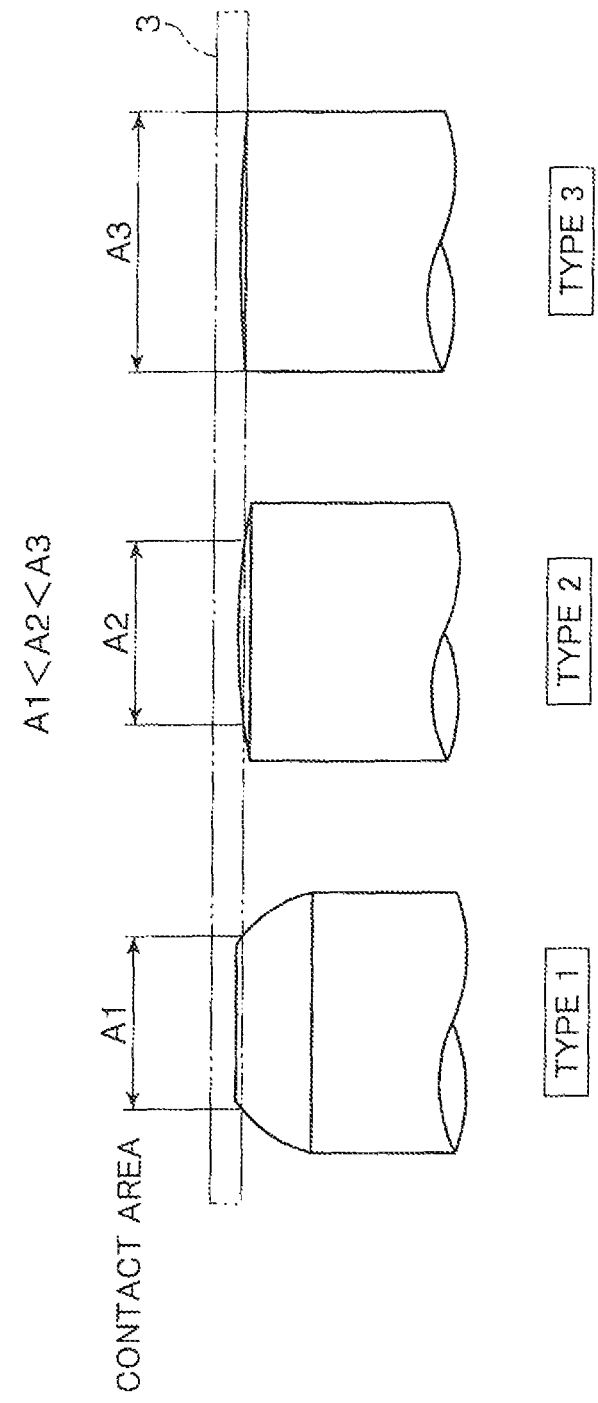
FIG. 19 is a diagram showing the magnitude relation of the area in which the type 1 to type 3 electrodes come in contact with the metal plate.

The reason why the cooling time is shorter in Examples 10 and 11 is considered to be because the type 2 and type 3 electrodes have a larger contact area with the metal plate. In other words, upon pressurizing the work W with the electrodes 7, 7 at the cooling step, the area of the electrode 7 to come in contact with the non-plated steel plate 3 is larger in the order of type 1, type 2, and type 3 as shown in FIG. 19. Accordingly, as a result of causing the type 2 or type 3 electrode to come in contact with the non-plated steel plate 3 rather than the type 1 electrode, heat can be efficiently absorbed through the electrode 7 during the cooling step, and sufficient cooling can be achieved without having to spend too much time. In addition, since the type 2 or type 3 electrode is caused to come in contact with the non-plated steel plate 3 with a larger thermal capacity and not the aluminum alloy plate 1, the cooling efficiency can be further improved.

Note that, the reason why the type 2 or type 3 electrode was used on the steel plate side and the type 1 electrode was used on the aluminum side in Examples 10 and 11 is because, if the type 2 or type 3 electrode with a large contact area is used on both the aluminum side and the steel plate side, the current density during the welding will decrease, and the formation of the nugget becomes difficult.

In either case, as with each of the Examples, as a result of using an electrode with a sufficiently large contact area with the metal plate, it is possible to form the complete welded part S2 of an annular shape with a large outer shape between the aluminum alloy plate 1 and the zinc plated steel plate 2 as shown in FIG. 7, and the strength of the joint part can be effectively improved. In addition, according to FIG. 7, since the adhesive part S4 that was caused to adhere using the adhesive 5 is formed to surround the outside of the complete welded part S2, it is possible to effectively prevent moisture from infiltrating between the aluminum alloy plate 1 and the zinc plated steel plate 2, and the occurrence of electrolytic corrosion resulting therefrom.

Note that, although the foregoing embodiment lapped the three metal plates configured from the aluminum alloy plate 1, the zinc plated steel plate 2 and the non-plated steel plate 3 and simultaneously joined the three metal plates, the joining does not necessarily have to be performed by including the non-plated steel plate 3, and only the aluminum alloy plate 1 and the zinc plated steel plate 2 may be joined with a similar method. In the foregoing case, the difference is in that the nugget part M2 of FIG. 7 is not formed.

Moreover, although the foregoing embodiment set the pressing force of the electrodes 7, 7 during the cooling step and the welding step to the same value (second pressing force F2), the pressing forces during the cooling step and the welding step will suffice so as long as they are respectively higher than the pressing force (first pressing force F1) at the start of the pre-heating step, and the pressing force during the cooling step and the pressing force during the welding step may be different.

Moreover, although the foregoing embodiment lapped and joined the steel plate (zinc plated steel plate) 2 in which zinc plating was performed on its surface and the aluminum alloy plate 1, a steel plate subject to plating other than zinc plating can also be preferably used as the plated steel plate 2. As one example thereof, an Example that used an aluminum plated steel plate or a zinc-aluminum-magnesium plated steel plate as the plated steel plate 2, and joined these steel plates and the aluminum alloy plate 1 using an adhesive and spot welding is now explained. The weight of plating and the plate thickness are the same as the case of the zinc plated steel plate 2. Moreover, the plating components of the zinc-aluminum-magnesium plated steel plate were Zn-11% Al-3% Mg.

The joining conditions in the Example using the aluminum plated steel plate or the zinc-aluminum-magnesium plated steel plate were the same as Example 2 (refer to FIG. 10) that was explained as one joining example of the zinc plated steel plate 2 and the aluminum alloy plate 1. The electrode type is also the same as Example 2. Moreover, as the Comparative Example for comparison with this Example, joining was performed under the same conditions as Comparative Example 1 (refer to FIG. 10) while substituting the zinc plated steel plate 2 with the aluminum plated steel plate or the zinc-aluminum-magnesium plated steel plate.

Consequently, the peel strength of the joined body of the aluminum plated steel plate and the aluminum alloy plate was 3.0 as a relative value when the peel strength of the Comparative Example is 1. Moreover, the peel strength of the joined body of the zinc-aluminum-magnesium plated steel plate and the aluminum alloy plate was also 3.0 as a relative value when the peel strength of the Comparative Example is 1. Note that the structure of the joined bodies obtained in the foregoing Examples was the same as the structure explained in FIG. 6 and FIG. 7 in either case of using the aluminum plated steel plate or the zinc-aluminum-magnesium plated steel plate.

Finally, the configuration and effect of the present invention disclosed based on the foregoing embodiments are now summarized and explained.

The present invention is a method of joining dissimilar metal plates of an aluminum alloy plate and a plated steel plate by means of adhesion of an adhesive and spot welding, the method including: a lapping step of lapping the aluminum alloy plate and the plated steel plate via the adhesive, a pre-heating step of clamping both of the metal plates that have been lapped in the lapping step between a pair of electrodes for spot welding and applying pressure thereto, and applying a current between the pair of electrodes, a cooling step of pressurizing, after the pre-heating step, both of the metal plates at a pressing force which is higher than that at the start of the pre-heating step in a state where conduction between the electrodes is stopped, and continuing this pressurization over a predetermined cooling time, and a welding step of pressurizing, after the cooling step, both of the metal plates at a pressing force which is higher than that at the start of the pre-heating step, and welding both of the metal plates by applying a current which is higher than the conduction current value in the pre-heating step between the pair of electrodes.

According to the joining method of the present invention, prior to applying a high current for welding to the aluminum alloy plate and the plated steel plate, since a pre-heating step of pressurizing and passing current through both of these metal plates with electrodes is performed, the adhesive between the aluminum alloy plate and the plated steel plate can be sufficiently softened with the warm-up effect based on conduction, while keeping the temperature of the metal to be within a range that is less than the melting point. Moreover, in the subsequent cooling step, by applying a higher pressing force in a state where the conduction is stopped, the adhesive can be efficiently discharged from the part that was subject to pressurization (pressurized part), and it is further possible to cause the metals to sufficiently fit each other. Consequently, the electrical resistance of the material (in particular the interface resistance of the aluminum alloy plate and the plated steel plate) is effectively reduced, and, even if a high welding current is applied from the electrodes, excessive resistance-caused heat quantity will not arise, and the phenomenon referred to as expulsion in which the base material scatters during the welding process is inhibited. Thus, it is possible to apply a higher welding current while securing favorable weldability, and the joint strength can be effectively improved.

Note that, although the specific value of the pressing force and the timing of changing the pressing force to be applied between the pre-heating step and the welding step can be change as needed, as a preferred example, the pressing force of the electrodes is set to a first pressing force during a predetermined period from the start of the pre-heating step, the pressing force is increased to a second pressing force that is greater than the first pressing force midway or at the end of the pre-heating step, and the pressurization is continued with the second pressing force until the completion of the cooling step and the welding step.

In the foregoing configuration, more preferably, prior to the pre-heating step, a pre-pressurization step of clamping the aluminum alloy plate and the plated steel plate between the pair of electrodes and applying pressure thereto is performed.

According to the foregoing configuration, there is an advantage in that the conduction current at the pre-heating step is stabilized and that an appropriate warm-up effect is obtained.

In addition, preferably, the pressing force at the pre-pressurization step is set to be greater than the first pressing force.

According to the foregoing configuration, since it is possible to actively discharge the adhesive from the pressurized part based on the electrodes even during the pre-pressurization step, when combined with the effects of the subsequent pre-heating step and the cooling step, the adhesive can be discharged from the pressurized part more reliably, and the weldability of the aluminum alloy plate and the plated steel plate can be further improved. Moreover, since the discharge force of the adhesive is improved, there is an advantage in that sufficient joint strength can be secured even if the time spent on the pre-heating step and the cooling step is shortened a certain degree.

In the joining method of the present invention, preferably, as the lapping step, in addition to lapping the aluminum alloy plate and the plated steel plate via the adhesive, a steel plate that is separate from the plated steel plate is lapped on an opposite surface of the plated steel plate to the aluminum alloy plate, and, in the foregoing state, the aluminum alloy plate, the plated steel plate and the separate steel plate are mutually joined by performing the respective steps including the pre-heating step, the cooling step and the welding step.

According to the foregoing configuration, there is an advantage in that three metal plates including the aluminum alloy plate and the plated steel plate can be joined simultaneously.

Moreover, the present invention is also a dissimilar metal joined body in which an aluminum alloy plate and a plated steel plate are joined, wherein a first joint part welded based on spot welding and a second joint part subject to adhesion with an adhesive exist between the aluminum alloy plate and the plated steel plate, and the first joint part is formed in an annular shape in a planar view.

According to the dissimilar metal joined body of the present invention, since there is a first joint part that is joined between the aluminum alloy plate and the plated steel plate based on spot welding and formed in an annular shape, there is an advantage in that the outside diameter of the joint part can be enlarged in comparison to a case of forming, for example, a joint part with the same area in a solid circle, and it is possible to build a joint structure that is resistant to bending and twisting and with superior fatigue strength. Moreover, since there is a second joint part subject to adhesion using an adhesive in addition to the first joint part, there is an advantage in that it is possible to effectively prevent moisture from infiltrating between the aluminum alloy plate and the plated steel plate, and the occurrence of electrolytic corrosion resulting therefrom.

In the dissimilar metal joined body of the present invention, preferably, the periphery of the first joint part is surrounded by the second joint part.

According to the foregoing configuration, there is an advantage in that the electrolytic corrosion described above can be more effectively prevented based on the adhesive of the second joint part that is formed to surround the first joint part.

In the dissimilar metal joined body of the present invention, preferably, a weak joint part with a thermolysis product of the adhesive remaining therein exists more on the center side than the first joint part of an annular shape.

According to the foregoing configuration, there is an advantage in that, even though a weak joint part in which the joint strength has been weakened due to the thermolysis product of the adhesive is formed on the center side, sufficient joint strength can be secured by forming the first joint part of an annular shape around the weak joint part.

In the dissimilar metal joined body of the present invention, preferably, a steel plate that is separate from the plated steel plate is joined to an opposite surface of the plated steel plate to the aluminum alloy plate.

Moreover, in the foregoing case, a nugget part is formed between the plated steel plate and the separate steel plate, and the nugget part does not come in contact with the aluminum alloy plate and is formed at a position which faces the first joint part.

According to the foregoing configuration, there is an advantage in that three metal plates including the aluminum alloy plate and the plated steel plate can be appropriately joined with sufficient joint strength.

This application is based on Japanese Patent application No. 2009-244345 filed in Japan Patent Office on Oct. 23, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A method of joining dissimilar metal plates of an aluminum alloy plate and a plated steel plate by means of adhesion of an adhesive and spot welding, the method comprising:
 a lapping step of lapping the aluminum alloy plate and the plated steel plate via the adhesive;
 a pre-pressuring step of clamping the aluminum alloy plate and the plated steel plate between the pair of electrodes and applying pressure therebetween;
 a pre-heating step of clamping both of the metal plates that have been lapped in the lapping step between a pair of electrodes for spot welding and applying pressure thereto, and applying a current between the pair of electrodes;
 a cooling step of pressurizing, after the pre-heating step, where both of the metal plates are pressed between the pair of electrodes at a pressing force which is higher than that at the start of the pre-heating step in a state where conduction between the electrodes is stopped, and continuing this pressurization over a predetermined cooling time; and
 a welding step of pressurizing, after the cooling step, where both of the metal plates are pressed between the pair of electrodes at a pressing force which is higher than that at the start of the pre-heating step, and both of the metal plates are welded by applying a current which is higher than the conduction current value in the pre-heating step between the pair of electrodes, wherein the pressing force of the electrodes is set to a first pressing force during a predetermined period from the start of the pre-heating step, the pressing force is increased to a second pressing force that is greater than the first pressing force in the middle of or at the end of the pre-heating step, and the pressurization is continued with the second pressing force until the completion of the cooling step and the welding step; and wherein the pressing force in the pre-pressurization step is set to be greater than the first pressing force.

2. The joining method of dissimilar metal plates according to claim 1, wherein as the lapping step, in addition to lapping the aluminum alloy plate and the plated steel plate via the adhesive, a steel plate that is separate from the plated steel plate is lapped on an opposite surface of the plated steel plate to the aluminum alloy plate, and in the foregoing state, the aluminum alloy plate, the plated steel plate and the separate steel plate are mutually joined by performing the respective steps of the pre-heating step, the cooling step and the welding step.

* * * * *